(12) United States Patent
Grassadonia et al.

(10) Patent No.: US 11,455,604 B2
(45) Date of Patent: *Sep. 27, 2022

(54) MONEY TRANSFER BY USE OF A PAYMENT PROXY

(71) Applicant: Block, Inc., San Francisco, CA (US)

(72) Inventors: Brian Grassadonia, San Francisco, CA (US); Jesse Wilson, Ontario (CA)

(73) Assignee: BLOCK, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,364

(22) Filed: Apr. 1, 2022

(65) Prior Publication Data

US 2022/0230148 A1 Jul. 21, 2022

Related U.S. Application Data

(63) Continuation of application No. 14/754,223, filed on Jun. 29, 2015.

(Continued)

(51) Int. Cl.
*G06Q 20/10* (2012.01)
*G06Q 20/08* (2012.01)
(Continued)

(52) U.S. Cl.
CPC ......... *G06Q 20/0855* (2013.01); *G06Q 20/10* (2013.01); *G06Q 20/16* (2013.01);
(Continued)

(58) Field of Classification Search
CPC ........ G06Q 40/00; G06Q 20/10; G06Q 20/16; G06Q 20/305; G06Q 20/405; G06Q 20/0855; G06Q 20/3223
(Continued)

(56) References Cited

U.S. PATENT DOCUMENTS

| 4,838,384 A | 6/1989 | Thangavelu |
| 5,506,898 A | 4/1996 | Costantini et al. |

(Continued)

FOREIGN PATENT DOCUMENTS

| JP | 2004102570 A | 4/2004 |
| WO | 2013/147954 A1 | 10/2013 |
| WO | 2016/069958 A1 | 5/2016 |

OTHER PUBLICATIONS

Zhu, Y.,"A new architecture for secure two-party mobile payment transactions", (Order No. MR68790), Available from ProQuest Dissertations and Theses Professional (822410582), Retrieved from Internet URL: https://dialog.proquest.com/professional/docview/822410582?accountid=131444, (2010), 239 pages.

(Continued)

*Primary Examiner* — Hani M Kazimi
(74) *Attorney, Agent, or Firm* — Mattingly & Malur, PC

(57) ABSTRACT

In some examples, a financial transaction is effectuated between first and second users of a payment service system. The payment service system receives, from the first user, a request for a first payment proxy identifier for the first user, and receives from the second user, a request for a second payment proxy identifier for the second user. The payment service system generates the payment proxy identifiers with a currency indicator prefixing one or more alphanumeric characters. The payment proxy identifiers enable the payment service system to identify the financial accounts of the respective users in lieu of payment card mechanisms. The payment service system receives a message from the second user indicating a money transfer request, initiates a transfer of funds from an account of the second user to an account of the first user, and sends an email message to the first user indicating the transfer of funds.

23 Claims, 16 Drawing Sheets

Related U.S. Application Data

(60) Provisional application No. 62/111,087, filed on Feb. 2, 2015, provisional application No. 62/073,844, filed on Oct. 31, 2014.

(51) Int. Cl.

| | |
|---|---|
| *H04L 51/046* | (2022.01) |
| *G06Q 50/00* | (2012.01) |
| *G06Q 20/32* | (2012.01) |
| *G06Q 20/34* | (2012.01) |
| *G06Q 20/40* | (2012.01) |
| *G06Q 20/30* | (2012.01) |
| *G06Q 20/16* | (2012.01) |
| *H04L 41/0273* | (2022.01) |

(52) U.S. Cl.
CPC ....... *G06Q 20/305* (2013.01); *G06Q 20/3223* (2013.01); *G06Q 20/3224* (2013.01); *G06Q 20/34* (2013.01); *G06Q 20/405* (2013.01); *G06Q 50/01* (2013.01); *H04L 41/0293* (2013.01); *H04L 51/046* (2013.01)

(58) Field of Classification Search
USPC ..................................................... 705/39–45
See application file for complete search history.

(56) References Cited

U.S. PATENT DOCUMENTS

| | | | |
|---|---|---|---|
| 6,707,905 B2 | 3/2004 | Lenard | |
| 6,829,583 B1 | 12/2004 | Knapp et al. | |
| 6,839,566 B2 | 1/2005 | Casaccia et al. | |
| 6,876,993 B2 | 4/2005 | LaButte et al. | |
| 7,089,208 B1 | 8/2006 | Levchin et al. | |
| 7,254,406 B2 | 8/2007 | Beros et al. | |
| 7,349,871 B2 | 3/2008 | Labrou et al. | |
| 7,376,587 B1 | 5/2008 | Neofytides et al. | |
| 7,580,719 B2 | 8/2009 | Karmarkar | |
| 7,606,734 B2 | 10/2009 | Baig et al. | |
| 7,620,404 B2 | 11/2009 | Chesnais et al. | |
| 7,694,287 B2 | 4/2010 | Singh et al. | |
| 7,783,537 B1 | 8/2010 | Van Luchene et al. | |
| 8,010,601 B2 | 8/2011 | Jennings et al. | |
| 8,090,616 B2 | 1/2012 | Proctor, Jr. et al. | |
| 8,208,388 B2 | 6/2012 | Casaccia et al. | |
| 8,385,964 B2 | 2/2013 | Haney | |
| 8,408,992 B2 | 4/2013 | de Cuba | |
| 8,428,079 B1 | 4/2013 | Lambert et al. | |
| 8,571,975 B1 | 10/2013 | Lehman et al. | |
| 8,606,703 B1 | 12/2013 | Dorsey et al. | |
| 8,661,046 B2 | 2/2014 | King et al. | |
| 8,694,435 B1 | 4/2014 | Bishop | |
| 8,751,379 B1 | 6/2014 | Bueche, Jr. | |
| 8,762,272 B1 * | 6/2014 | Cozens ................ | G06Q 20/223 705/40 |
| 9,264,850 B1 | 2/2016 | Lee | |
| 9,378,491 B1 | 6/2016 | Grassadonia et al. | |
| 9,652,769 B1 | 5/2017 | Golin | |
| 9,710,821 B2 | 7/2017 | Heath | |
| 9,715,709 B2 | 7/2017 | Carlson | |
| 9,767,443 B1 | 9/2017 | Wilson et al. | |
| 9,799,071 B1 | 10/2017 | Wilson et al. | |
| 9,805,358 B2 | 10/2017 | Green et al. | |
| 10,339,506 B2 | 7/2019 | Kassemi et al. | |
| 10,387,874 B1 | 8/2019 | Birand et al. | |
| 10,552,828 B2 | 2/2020 | Hammad | |
| 10,614,445 B1 | 4/2020 | Dorsey et al. | |
| 10,769,619 B2 | 9/2020 | Bennett | |
| 10,963,868 B1 | 3/2021 | McCauley et al. | |
| 11,354,645 B1 | 6/2022 | Dorsey et al. | |
| 2001/0014878 A1 | 8/2001 | Mitra et al. | |
| 2002/0114442 A1 | 8/2002 | Lieberman et al. | |
| 2003/0037074 A1 | 2/2003 | Dwork et al. | |
| 2003/0045272 A1 | 3/2003 | Burr | |
| 2003/0061170 A1 | 3/2003 | Uzo | |
| 2003/0120936 A1 | 6/2003 | Farris et al. | |
| 2004/0039630 A1 | 2/2004 | Begole et al. | |
| 2004/0148252 A1 | 7/2004 | Fleishman | |
| 2004/0177005 A1 | 9/2004 | Poltorak | |
| 2004/0264466 A1 | 12/2004 | Huang | |
| 2005/0174975 A1 | 8/2005 | Mgrdechian et al. | |
| 2005/0286686 A1 | 12/2005 | Krstulich | |
| 2006/0148532 A1 | 7/2006 | Schnurr | |
| 2006/0224542 A1 | 10/2006 | Yalamanchi | |
| 2006/0235796 A1 | 10/2006 | Johnson et al. | |
| 2006/0277550 A1 | 12/2006 | Williams et al. | |
| 2007/0124721 A1 | 5/2007 | Cowing et al. | |
| 2007/0136118 A1 | 6/2007 | Gerlach et al. | |
| 2007/0150411 A1 | 6/2007 | Addepalli et al. | |
| 2007/0203836 A1 | 8/2007 | Dodin | |
| 2007/0208816 A1 | 9/2007 | Baldwin et al. | |
| 2007/0255652 A1 | 11/2007 | Tumminaro et al. | |
| 2007/0255653 A1 | 11/2007 | Tumminaro et al. | |
| 2007/0265984 A1 | 11/2007 | Santhana | |
| 2008/0010190 A1 | 1/2008 | Rackley, III et al. | |
| 2008/0154798 A1 | 6/2008 | Valz | |
| 2008/0162340 A1 | 7/2008 | Zimmer et al. | |
| 2008/0182591 A1 | 7/2008 | Krikorian | |
| 2009/0063353 A1 | 3/2009 | Viidu et al. | |
| 2009/0070263 A1 | 3/2009 | Davis et al. | |
| 2009/0157652 A1 | 6/2009 | Barbosa et al. | |
| 2009/0164374 A1 | 6/2009 | Shastry | |
| 2009/0281817 A1 | 11/2009 | Ferrara et al. | |
| 2010/0082481 A1 | 4/2010 | Lin et al. | |
| 2010/0169264 A1 | 7/2010 | O'Sullivan et al. | |
| 2010/0211592 A1 | 8/2010 | Brownlee | |
| 2010/0211938 A1 | 8/2010 | Singh et al. | |
| 2010/0250682 A1 | 9/2010 | Goldberg et al. | |
| 2010/0268648 A1 | 10/2010 | Wiesman et al. | |
| 2010/0312626 A1 | 12/2010 | Cervenka | |
| 2011/0078260 A1 | 3/2011 | Rashad et al. | |
| 2011/0087742 A1 | 4/2011 | Deluca et al. | |
| 2011/0119190 A1 | 5/2011 | Mina | |
| 2011/0145152 A1 | 6/2011 | McCown | |
| 2011/0178883 A1 | 7/2011 | Granbery et al. | |
| 2011/0231292 A1 | 9/2011 | McCown | |
| 2011/0251892 A1 | 10/2011 | Laracey | |
| 2012/0054102 A1 | 3/2012 | Schwartz et al. | |
| 2012/0095905 A1 | 4/2012 | Hodges | |
| 2012/0130903 A1 | 5/2012 | Dorsey et al. | |
| 2012/0158589 A1 | 6/2012 | Katzin et al. | |
| 2012/0209749 A1 | 8/2012 | Hammad et al. | |
| 2012/0246252 A1 | 9/2012 | Denise | |
| 2012/0253852 A1 | 10/2012 | Pourfallah et al. | |
| 2012/0259782 A1 | 10/2012 | Hammad | |
| 2013/0024506 A1 | 1/2013 | Setton | |
| 2013/0060708 A1 | 3/2013 | Oskolkov et al. | |
| 2013/0085931 A1 | 4/2013 | Runyan | |
| 2013/0110656 A1 | 5/2013 | Chau et al. | |
| 2013/0132502 A1 | 5/2013 | Stacey et al. | |
| 2013/0229930 A1 | 9/2013 | Akay et al. | |
| 2013/0232075 A1 | 9/2013 | Monaghan et al. | |
| 2013/0275301 A1 | 10/2013 | Lehman et al. | |
| 2013/0290234 A1 | 10/2013 | Harris et al. | |
| 2013/0297385 A1 | 11/2013 | Mehta et al. | |
| 2013/0316808 A1 | 11/2013 | Nelson et al. | |
| 2013/0332344 A1 | 12/2013 | Weber | |
| 2014/0019341 A1 | 1/2014 | Frohwein | |
| 2014/0025958 A1 | 1/2014 | Calman | |
| 2014/0040130 A1 * | 2/2014 | Kunz ................ | G06Q 20/3674 705/44 |
| 2014/0046851 A1 | 2/2014 | Lehman et al. | |
| 2014/0108247 A1 | 4/2014 | Artman et al. | |
| 2014/0136352 A1 | 5/2014 | Ramakrishna et al. | |
| 2014/0172531 A1 | 6/2014 | Liberty et al. | |
| 2014/0181934 A1 | 6/2014 | Mayblum et al. | |
| 2014/0207679 A1 | 7/2014 | Cho | |
| 2014/0222595 A1 | 8/2014 | Fernandes | |
| 2014/0254575 A1 | 9/2014 | Venkatraman et al. | |
| 2014/0279436 A1 | 9/2014 | Dorsey et al. | |
| 2014/0279444 A1 | 9/2014 | Kassemi et al. | |
| 2014/0279447 A1 | 9/2014 | Dorsey et al. | |
| 2014/0279474 A1 | 9/2014 | Evans et al. | |

(56) References Cited

U.S. PATENT DOCUMENTS

| | | |
|---|---|---|
| 2014/0279556 A1 | 9/2014 | Priebatsch et al. |
| 2014/0304510 A1 | 10/2014 | Sannegowda et al. |
| 2014/0348143 A1 | 11/2014 | Kato et al. |
| 2014/0372308 A1 | 12/2014 | Sheets |
| 2015/0031393 A1 | 1/2015 | Post et al. |
| 2015/0081462 A1 | 3/2015 | Ozvat et al. |
| 2015/0088754 A1 | 3/2015 | Kirsch |
| 2015/0100482 A1 | 4/2015 | Zamer et al. |
| 2015/0170092 A1 | 6/2015 | Klein |
| 2015/0186887 A1 | 7/2015 | Khan et al. |
| 2015/0339696 A1 | 11/2015 | Zhou et al. |
| 2015/0358476 A1 | 12/2015 | Flores-Estrada |
| 2016/0019536 A1 | 1/2016 | Ortiz et al. |
| 2016/0042379 A1 | 2/2016 | Lupoli et al. |
| 2016/0048830 A1 | 2/2016 | Laracey |
| 2016/0117670 A1 | 4/2016 | Davis |
| 2016/0125369 A1 | 5/2016 | Grassadonia et al. |
| 2016/0277560 A1 | 9/2016 | Gruberman et al. |
| 2017/0287022 A1 | 10/2017 | Capps et al. |
| 2021/0117940 A1 | 4/2021 | Grassadonia et al. |

OTHER PUBLICATIONS

Non-Final Office Action dated May 13, 2021 for U.S. Appl. No. 14/754,223, of Grassadonia, B., et al., filed Jun. 29, 2015.
Non-Final Office Action dated Jun. 25, 2021 for U.S. Appl. No. 17/216,385, of McCauley, N., et al., filed Mar. 29, 2021.
Non-Final Office Action dated Jul. 30, 2021 for U.S. Appl. No. 16/828,817, of Dorsey, J., et al., filed Mar. 24, 2020.
Non-Final Office Action dated Sep. 16, 2021 for U.S. Appl. No. 17/138,702, of Grassadonia, B., et al., filed Dec. 30, 2020.
Final Office Action dated Oct. 5, 2021 for U.S. Appl. No. 14/754,223, of Grassadonia, B., et al., filed Jun. 29, 2015.
Final Office Action dated Nov. 8, 2021, for U.S. Appl. No. 17/216,385, of McCauley, N., et al., filed Mar. 29, 2021.
Notice of Allowance dated Feb. 4, 2022, for U.S. Appl. No. 17/216,385, of McCauley, N., et al., filed Mar. 29, 2021.
Final Office Action dated Feb. 7, 2022 for U.S. Appl. No. 17/138,702, of Grassadonia, B., et al., filed Dec. 30, 2020.
Notice of Allowance dated Feb. 10, 2022 for U.S. Appl. No. 16/828,817, of Dorsey, J., et al., filed Mar. 24, 2020.
Notice of Allowance dated Feb. 16, 2022 for U.S. Appl. No. 14/754,223, of Grassadonia, B., et al., filed Jun. 29, 2015.
Corrected Notice of Allowability dated Mar. 2, 2022 for U.S. Appl. No. 14/754,223, of Grassadonia, B., et al., filed Jun. 29, 2015.
Notice of Allowance dated Mar. 3, 2022 for U.S. Appl. No. 16/828,817, of Dorsey, J., et al., filed Mar. 24, 2020.
Non-Final Office Action dated Mar. 16, 2022 for U.S. Appl. No. 17/138,702, of Grassadonia, B., et al., filed Dec. 30, 2020.
Notice of Allowance dated Apr. 13, 2022, for U.S. Appl. No. 17/216,385, of McCauley, N., et al., filed Mar. 29, 2021.
Church, K.W., "A stochastic parts program and noun phrase parser for unrestricted text," Proceedings of the second conference on Applied natural language processing, pp. 136-143 (Feb. 9, 1988).
Cover, T. M., and Thomas, J. A., "Elements of Information Theory," John Wiley and Sons, Inc. Publication, New York (1991), pp. 1-140, at http://www.cs-114.org/wp-content/uploads/2015/01/Elements_of_Information_Theory_Elements.pdf. [Part—1].
Cover, T. M., and Thomas, J. A., "Elements of Information Theory," John Wiley and Sons, Inc. Publication, New York (1991), pp. 141-281, at http://www.cs-114.org/wp-content/uploads/2015/01/Elements_of_Information_Theory_Elements.pdf. [Part—2].
Cover, T. M., and Thomas, J. A., "Elements of Information Theory," John Wiley and Sons, Inc. Publication, New York (1991), pp. 282-419, at http://www.cs-114.org/wp-content/uploads/2015/01/Elements_of_Information_Theory_Elements.pdf. [Part—3].
Cover, T. M., and Thomas, J. A., "Elements of Information Theory," John Wiley and Sons, Inc. Publication, New York (1991), pp. 420-563, at http://www.cs-114.org/wp-content/uploads/2015/01/Elements_of_Information_Theory_Elements.pdf. [Part—4].

Derouault, A. M., and Merialdo, B., "Probabilistic grammar for phonetic to French transcription," ICASSP '85, IEEE International Conference on Acoustics, Speech, and Signal Processing, pp. 1577-1580 (1985), at https://ieeexplore.ieee.org/abstract/document/1168078/.
European Patent Office; "EPO Summary of Arguments", Minutes of the Oral Proceedings before the Examining Division; dated Sep. 22, 2015; Munich, DE.
Magerman, D.M., "Natural Language Parsing As Statistical Pattern Recognition," PhD Thesis, Stanford University, dated Feb. 1994, pp. 1-158.
Magerman, D.M., "Parsing as Statistical Pattern Recognition," IBM T. J. Watson Research Center, dated Jan. 16, 1995, pp. 1-15.
Gao, J., et al. "A 2D Barcode-Based Mobile Payment System", 2009 Third International Conference on Multimedia and Ubiquitous Engineering, 11 pages (2009).
Nseir, S., et al. "A Secure Mobile Payment System using QR Code", 2013 5th International Conference on Computer Science and Information Technology (CSIT), 4 pages (2013).
Isaac, J.T., et al. "Anonymous Payment in a Client Centric Model for Digital Ecosystems", 2007 Inaugural IEEE International Conference on Digital Ecosystems and Technologies (IEEE DEST 2007), 6 pages.
Yang, Ming-Hour "Security Enhanced EMV-Based Mobile Payment Protocol", Hindawi Publishing Corporation, The Scientific World Journal, vol. 2014, Article ID 864571, 19 pages; http://dx.doi.org/10.1155/2014/864571 (2014).
Non-Final Office Action dated Jan. 5, 2015 for U.S. Appl. No. 14/284,227, of Wilson, J., et al., filed May 21, 2014.
Final Office Action dated Jun. 25, 2015 for U.S. Appl. No. 14/284,227, of Wilson, J., et al., filed May 21, 2014.
Non-Final Office Action dated Feb. 2, 2016, for U.S. Appl. No. 14/754,223, of Grassadonia, B., et al., filed Jun. 29, 2015.
Non-Final Office Action dated Mar. 24, 2016 for U.S. Appl. No. 14/284,227, of Wilson, J., et al., filed May 21, 2014.
Non-Final Office Action dated Mar. 25, 2016, for U.S. Appl. No. 14/276,659, of Wilson, J., et al., filed May 13, 2014.
Non-Final Office Action dated Aug. 11, 2016, for U.S. Appl. No. 14/296,385, of Dorsey, J., et al., filed Jun. 4, 2014.
Final Office Action dated Aug. 12, 2016, for U.S. Appl. No. 14/754,223, of Grassadonia, B., et al., filed Jun. 29, 2015.
Non-Final Office Action dated Aug. 30, 2016, for U.S. Appl. No. 14/444,741, of Seemann, D., et al., filed Jul. 28, 2014.
Final Office Action dated Sep. 29, 2016, for U.S. Appl. No. 14/276,659, of Wilson, J., et al., filed May 13, 2014.
Final Office Action dated Oct. 6, 2016 for U.S. Appl. No. 14/284,227, of Wilson, J., et al., filed May 21, 2014.
Non-Final Office Action dated Nov. 18, 2016, for U.S. Appl. No. 14/296,385, of Dorsey, J., et al., filed Jun. 4, 2014.
Advisory Action dated Dec. 15, 2016, for U.S. Appl. No. 14/754,223, of Grassadonia, B., et al., filed Jun. 29, 2015.
Advisory Action dated Jan. 12, 2017 for U.S. Appl. No. 14/284,227, of Wilson, J., et al., filed May 21, 2014.
Non-Final Office Action dated Jan. 20, 2017, for U.S. Appl. No. 14/276,659, of Wilson, J., et al., filed May 13, 2014.
Notice of Allowance dated May 30, 2017, for U.S. Appl. No. 14/276,659, of Wilson, J., et al., filed May 13, 2014.
Notice of Allowance dated Jun. 30, 2017 for U.S. Appl. No. 14/284,227, of Wilson, J., et al., filed May 21, 2014.
Final Office Action dated Jul. 10, 2017 for U.S. Appl. No. 14/296,385, of Dorsey, J., et al., filed Jun. 4, 2014.
Non-Final Office Action dated Aug. 24, 2017, for U.S. Appl. No. 14/481,760, of McCauley, N.P., et al., filed Sep. 9, 2014.
Final Office Action dated Oct. 6, 2017, for U.S. Appl. No. 14/444,741, of Seemann, D., et al., filed Jul. 28, 2014.
Non-Final Office Action dated Mar. 9, 2018, for U.S. Appl. No. 14/754,223, of Grassadonia, B., et al., filed Jun. 29, 2015.
Non-Final Office Action dated Apr. 26, 2018, for U.S. Appl. No. 14/296,385, of Dorsey, J., et al., filed Jun. 4, 2014.
Final Office Action dated May 15, 2018, for U.S. Appl. No. 14/481,760, of McCauley, N.P., et al., filed Sep. 9, 2014.
Non-Final Office Action dated Aug. 10, 2018, for U.S. Appl. No. 14/444,741, of Seemann, D., et al., filed Jul. 28, 2014.

(56) References Cited

OTHER PUBLICATIONS

Advisory Action dated Aug. 27, 2018 for U.S. Appl. No. 14/481,760, of McCauley, N.P., et al., filed Sep. 9, 2014.
Final Office Action dated Oct. 19, 2018, for U.S. Appl. No. 14/754,223, of Grassadonia, B., et al., filed Jun. 29, 2015.
Final Office Action dated Dec. 10, 2018, for U.S. Appl. No. 14/296,385, of Dorsey, J., et al., filed Jun. 4, 2014.
Non-Final Office Action dated May 2, 2019, for U.S. Appl. No. 14/481,760, of McCauley, N.P., et al., filed Sep. 9, 2014.
Final Office Action dated Jul. 8, 2019, for U.S. Appl. No. 14/444,741, of Seemann, D., et al., filed Jul. 28, 2014.
Non-Final Office Action dated Oct. 8, 2019, for U.S. Appl. No. 14/754,223, of Grassadonia, B., et al., filed Jun. 29, 2015.
Notice of Allowance dated Nov. 27, 2019, for U.S. Appl. No. 14/296,385, of Dorsey, J., et al., filed Jun. 4, 2014.
Advisory Action dated Dec. 4, 2019 for U.S. Appl. No. 14/444,741, of Seemann, D., et al., filed Jul. 28, 2014.
Final Office Action dated Feb. 4, 2020, for U.S. Appl. No. 14/481,760, of McCauley, N.P., et al., filed Sep. 9, 2014.
Final Office Action dated Apr. 6, 2020, for U.S. Appl. No. 14/754,223, of Grassadonia, B., et al., filed Jun. 29, 2015.
Advisory Action dated Jun. 9, 2020 for U.S. Appl. No. 14/754,223, of Grassadonia, B., et al., filed Jun. 29, 2015.
Notice of Allowance dated Nov. 25, 2020, for U.S. Appl. No. 14/481,760, of McCauley, N.P., et al., filed Sep. 9, 2014.
International Search Report and Written Opinion for International Application No. PCT/US2015/058168, dated Apr. 12, 2016.
Non-Final Office Action dated May 12, 2022 for U.S. Appl. No. 17/138,702, of Grassadonia, B., et al., filed Dec. 30, 2020.
Notice of Allowance dated May 12, 2022, for U.S. Appl. No. 17/216,385, of McCauley, N., et al., filed Mar. 29, 2021.
Votice of Allowance dated Jun. 23, 2022 for U.S. Appl. No. 17/138,702, of Grassadonia, B., et al., filed Dec. 30, 2020.
Corrected Notice of Allowability dated Jun. 27, 2022, for U.S. Appl. No. 17/216,385, of McCauley, N., et al., filed Mar. 29, 2021.

\* cited by examiner

| Customer ID1 | Customer ID2 | Customer ID3 | First Name | Last Name | Billing Address |
|---|---|---|---|---|---|
| $aaron | aaron@gmail.com | 571-272-1234 | Aaron | Doe | 654 ABC St., New York, NY 10086 |
| $alex | alex@gmail.com | -- | Alex | Smith | -- |
| $Bernie | -- | 650-764-2980 | Bernie | Doe | 30 Rock St., New York, NY 10086 |
| $funnyguy311 | funnyBernie@gmail.com | 203-764-2980 | Bernie | Smith | 123 Sesame St., Palo Alto, CA 94304 |
| $redcross | redcross@gmail.com | 310-888-1000 | The | Redcross | 123 Easy St., Mountain View, CA 94041 |

902

| Customer ID1 | Card Number/Account Number | Issuer | Expiration | Billing Address |
|---|---|---|---|---|
| $aaron | XXXXXXXXX | Bank of America | 1/31/2016 | 123 Sesame St., Palo Alto, CA 94304 |
| $alex | XXXX-XXXX-XXXX-XXXX | Wells Fargo | 5/31/2017 | 100 PQ st, Seattle, WA 98101 |
| $redcross | XXXXXXXXX | Chase | 6/1/2015 | 654 ABC St., New York, NY 10086 |
| $Bernie | -- | -- | -- | 30 Rock St., New York, NY 10086 |
| $funnyguy311 | XXXX-XXXX-XXXX-XXXX | Wells Fargo | 1/31/2016 | 123 Easy St., Mountain View, CA 94041 |

904

| Transaction Date | Transaction ID | Customer ID1 | Customer2 ID1 | Amount |
|---|---|---|---|---|
| 10986 | 22351 | $redcross | $aaron | $25 |
| Coffee | 25684 | $alex | $Bernie | $15 |
| Pastry | 25684 | $funnyguy311 | $alex | $5 |
| 56986 | 25684 | $aaron | $alex | $50 |
| 10988 | 25114 | $Bernie | $aaron | $100 |

From: pss@square.com
To: alex@gmail.com
Subject: You've sent $funnyguy311 $5!

You've sent $5 to $funnyguy311. To confirm, go here to link your card!

*FIG. 10A*

From: pss@square.com
To: funnyBernie@gmail.com
Subject: You've received $5!

You've received $5 for "Awesome street performance! Here's $5 support from me."

To receive the money, go here to link your card!

MONEY TRANSFER BY USE OF A PAYMENT PROXY

CROSS-REFERENCES TO RELATED APPLICATIONS

This application is a continuation of, and claims priority to, U.S. patent application Ser. No. 14/754,223, filed Jun. 29, 2015, which claims the benefit of U.S. Provisional Patent Application No. 62/111,087 filed Feb. 2, 2015, and U.S. Provisional Patent Application No. 62/073,844, filed Oct. 31, 2014, all of which are incorporated by reference herein.

BACKGROUND

Payment transactions have become an important part of everyday life. With the widespread use of the Internet, it is becoming very convenient, and even desirable, for individuals to conduct payment transactions online. Solutions exist to enable electronic money transfers, e.g., through Automated Clearing House (ACH) transfers, wire transfers, etc. However, these existing solutions are generally not designed to service non-sophisticated individuals and often involve a considerable amount of time and activation energy to execute (e.g., account setup, username/password verification, etc.). Accordingly, even a simple act of conveying and/or collecting money for an everyday life activity, e.g., "IOUs," donations from family and friends, etc., can become a burdensome task.

BRIEF DESCRIPTION OF THE DRAWINGS

Embodiments of the disclosed technology will be described and explained through the use of the accompanying drawings in which:

FIG. 9 illustrates example database tables coupled to the payment service system.

FIGS. 10A-10B illustrate various examples of graphical user interfaces for emails received by recipients of money transfers.

FIG. 11 illustrates examples of graphical user interfaces for a landing page and/or a website that enables a user to submit card information for associating with the payment service system.

DETAILED DESCRIPTION

Figure 1:
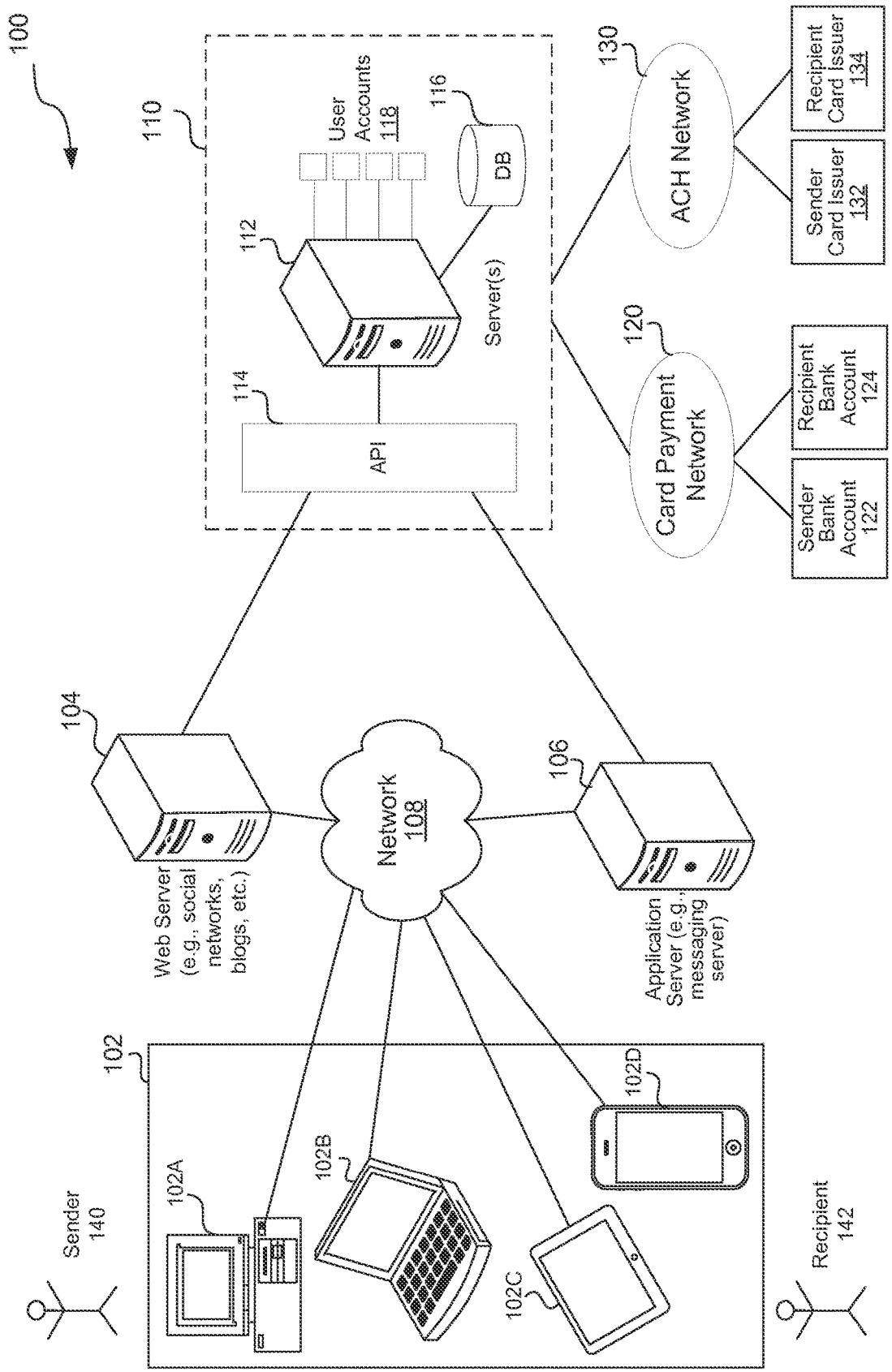
FIG. 1 illustrates an example of a network-based environment in which some embodiments of a payment proxy technology can be implemented.

Technology is disclosed for simplifying a transfer of cash (i.e., money) between a sender and a recipient by use of a tagging mechanism ("the cash tag technology"). As used here, the term "tagging" refers to a marking of an alphanumeric character (or a string of alphanumeric characters) to identify it (i.e., the character or string) for treatment in a specified way. The term "alphanumeric character" as used here refers to a symbol that can be a number (i.e., numeric), a letter (i.e., alphabetic), or a combination thereof. Briefly described, the cash tag technology enables a sender, who desires to send cash to a recipient, to trigger a money transfer by specifying, in any communication message, an amount and a recipient using one or more inputs having a particular syntax. The syntax includes a monetary currency indicator (or "currency indicator") prefixing one or more alphanumeric characters. The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies, e.g., dollar ($), euro (€), pound (£), rupee M, yuan (Y), etc. Although use of the dollar currency indicator ($) is used herein, it is to be understood that any currency symbol could equally be used.

Today, money transferring solutions typically require some form of registration by both parties involved in the transaction (i.e., a sender and a recipient of the payment) before the payment transfer can occur. The registration generally includes an account creation process and a login verification process. In particular, a sender must (a) enter various account information, e.g., name, address, email address, etc., to create an account with a particular payment service, and (b) wait for a verification email to verify the sender's identity associated with the newly created account, for example, by clicking on a web address included in the verification email to enter various authentication credentials, e.g., login name, password, etc. Some existing solutions also require verification of the banking institution(s) linked to the account, e.g., verify authentication amount deposited in the sender's bank account. Furthermore, to transfer money to the recipient, the sender generally must know at least some financial account information of, or other identifier for, the recipient, e.g., a bank account number, a routing number, a telephone number, an email address, etc.

In contrast, the cash tag technology introduced here provides efficient execution of financial transactions (e.g., payment transfers) by enabling a sender to trigger a money transfer through the use of the syntax in any communication message. In particular, the sender can specify, in a communication message, an amount of money to transfer by including an input having the syntax, where the input can include the monetary indicator and one or more numeric characters (e.g., $10). In some instances, the sender can also specify, in the communication message, the recipient to whom the sender intends to send the money by including another input having the syntax. The input can include the monetary indicator and one or more alphabetic and/or numeric characters (e.g., $alex or $alex123). Such input identifying the recipient is referred to as a "payment proxy" in this description, as shorthand.

A computer system, upon receiving indication of the sender's desire for money transfer (i.e., as indicated by the input(s) having the syntax), initiates the money transfer on behalf of the sender (i.e., executes, or causes to be executed, one or more operations to transfer funds between the appropriate accounts). The transfer can be initiated irrespective of the financial institution with which the sender or the recipient is associated. For example, the cash can be transferred even though the sender may have a financial account associated with Bank A while the recipient may have a financial account associated with Bank B. Furthermore, the computer system can initiate the transfer regardless of the bank-acquirer-financial institution structure associated with the recipient. Once the payment proxy is provided, the computer system can identify the associations and establish the communication links to initiate the transfer. Additionally, the computer system executes, or causes to be executed, the transfer in such a way that neither the sender nor the recipient is privy to sensitive information about each other. In particular, the computer system can encrypt financial information and any other personal identifying information (e.g., email addresses, phone numbers, usernames, payment proxies, etc.), thereby securing payment transaction(s) between the sender and the recipient and keeping all information "hidden" from the respective parties. The computer system can also shield such information from financial institutions (e.g., banks) that may otherwise target products and/or services using any known information of the parties (e.g., personal identifying information).

As will be discussed in further details below, the cash tag technology can be implemented in a variety of contexts. In some embodiments, the cash tag technology can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by the content provider to enable users of the forum to interact with one another, e.g., through creating messages, posting comments, etc. In some embodiments, forum may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

Within a forum context, the cash tagging technology involves communication between a sender's processing device, a computer system employed by the content provider and a computer system employed by a payment service (hereinafter, a "payment service system" or "PSS"). The payment service system, in coordination with the computer system of the content provider, monitors messages, comments, forms, and/or posts at the forum (or referred to here and throughout as "forum messages" for simplicity) to detect an indication of an intent to transfer money to a recipient. In particular, the computer system of the content provider can parse forum messages to identify a specified syntax associated with any user input included in any of the forum. Upon identification of the specified syntax in a particular forum message, the computer system of the content provider, communicating via an application program interface (API) associated with the payment service system, can notify the payment service system. For example, the computer system of the content provider can transmit a notification message over a network to the payment service system, where that notification message includes information about one or more inputs in the particular forum message that have the syntax. An input having the syntax can be an input that indicates an amount of money (e.g., $10), or an input representative of a payment proxy (e.g., $alex) that identifies a recipient of money. Upon receiving notification message, the payment service system identifies the amount of money and the recipient for the money transfer based on information in the notification message. The payment service system can identify the recipient based on the payment proxy (if one is included) or based on another identifier of the recipient (e.g., email address, username, phone number, etc.) that is part of the forum message. The payment service system can further identify a recipient financial account of the recipient by mapping the recipient's identifier to the financial account using association data stored in a database. That database can be a database of the payment service system (e.g., where the identifier is a payment proxy), or a database of the content provider (e.g., where the identifier is a username associated with the content provider). After the recipient financial account is identified, the payment service system can initiate, or trigger initiation, of a transfer of funds indicative of a payment amount from a sender financial account to the identified recipient financial account.

Consider an example scenario where a user sender can indicate an intent to transfer money by specifying, in a forum message that the user "posts" on a microblog of The Red Cross®, "Here is my support of $10." In such an example, the microblog can discover the user's intent to send money, e.g., by parsing the message, based on an identification of the syntax in the input "$10." Note that the parsing can be performed, for example, by a browser client. Alternatively, the parsing can be performed by a server in communication with the browser client. For example, all forum messages at the microblog are transmitted to the server which performs the parsing, among other functionalities associated with the microblog.

In another example scenario, the user can post a forum message on a video sharing platform, where the forum message can include an input that identifies the recipient, e.g., "$funnyguy311, great content! Here is my support for 10." In such example, the video sharing platform can discover the user's intent based on a parsing of the forum message and resulting identification of the syntax in the payment proxy Ifunnyguy311." The video sharing platform can notify the payment service system by forwarding the content of the forum message (e.g., a portion, or all, of the information parsed from the forum message). The video sharing platform can also recognize the monetary amount of "10" intended to be transferred to the recipient and forwards this information to the payment service platform. Alternatively, this amount can be identified by the payment service system upon receiving the content of the forum message.

Upon receiving the content of the forum message, the payment service system can identify the recipient financial account for the money transfer by mapping the payment proxy included in the message (e.g., "$funnyguy311") to the recipient financial account, based on association data stored in the payment service system's database that maintains information of users of the payment service. In instances where the payment proxy is not included (e.g., the microblog example), the payment service system can identify the recipient financial account by mapping a different identifier of the recipient (e.g., username associated with the forum provided by the content provider) with the recipient financial account. For example, the payment service system communicates with the content provider's database storing information about users of the content provider.

Similarly, the payment service system can identify the sender financial account by mapping an identifier of the sender with the sender financial account. The identifier of the sender ("sender identifier") can be identified based on who is currently accessing the forum, e.g., using a browser client. For example, the browser client identifies the user that is currently logged in and communicates that information to the payment service system. Alternatively, the sender identifier can be identified based on new login credentials submitted by the sender (e.g., entered at the forum and/or at an interface associated with the payment service system and presented via the forum). Upon identification of both the sender and the recipient financial accounts, the payment service system transfers, or causes, to be transferred, the funds indicative of the amount to the recipient financial account.

Within the context of a forum being an online shopping portal, the cash tag technology involves providing one or more form fields to receive a payment proxy, instead of financial information of a payment card. Once the payment proxy is submitted as a mechanism for payment, a transfer of funds from a sender to a recipient can be confirmed by a notification to the sender device, e.g., via a text message, a push message or a phone call made out to a phone number associated with the sender device. The text or push message may have hyperlinks for the user to select or interact with in order to approve the payment. The phone call may request answers to security questions to approve the payment. Alternatively, an interactive webpage may be provided to obtain additional information to secure the transaction.

In some embodiments, the cash tag technology can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by a messaging service provider that delivers a communication service to users, e.g., chat or messaging capability. The messaging application can include, for example, a text messaging application for communication between phones (e.g., conventional mobile telephones or smartphones), or a cross-platform instant messaging application for smartphones and phones that use the Internet for communication. The messaging application can be executed on a user's computing device (e.g., mobile device or conventional personal computer (PC)) based on instructions transmitted to and from a messaging computer server system ("messaging server"). In some instances, the messaging application can include a payment application with messaging capability that enables users of the payment application to communicate with one another. In such instances, the payment application can be executed on the user's computing device based on instructions transmitted to and from a computer server system employed by a payment service (e.g., the payment service discussed in this description or another payment service that supports payment transactions).

Within a messaging application context, the cash tagging technology involves communication between a messaging application executing on a user's mobile device, a payment application also executing on the mobile device, and a remote payment service system (PSS). Consider an example scenario where a sender user (or simply, "sender") launches a mobile messaging application executing on her mobile device (e.g., a smartphone or a tablet computer) to send a message to a recipient. For example, the sender inputs a telephone number of the recipient in a "TO" field of a user interface of the mobile messaging application to send a text message to the recipient. Although a text message is used as an example here, it is to be understood that the cash tag technology may employ any type of message, including, for example, a chat message, an email message, or indeed any other type that is capable of being exchanged between computing devices.

The sender can proceed to compose a message (or note in the body of the message) to the recipient by including, among other things, an input that contains a monetary currency indicator prefixing a numeric character (e.g., "Here is the $10 I owe you. Thanks."). The mobile messaging application can parse the message to detect that the input has the syntax that includes a monetary currency indicator prefixing an alphanumeric character. In response, the mobile messaging application can identify the recipient to whom the message is being sent (e.g., based on the telephone number), identifies the amount desired by the sender to be sent to the recipient (e.g., based on the numeric character(s) of the input), and communicates that information to the payment application, which in turn communicates with the PSS for processing the money transfer.

In some embodiments, the mobile messaging application determines identification information associated with the recipient on behalf of the PSS by communicating with the messaging server. In such embodiments, the mobile messaging application, for example, can send a request to the messaging server, where the request includes a unique ID/username of the recipient. The messaging server can perform a database lookup based on that username. In this example, the messaging server computer system can determine whether the username is associated with any identification information (e.g., an email address, a telephone number, etc.). The messaging server can send that identification information back to the mobile messaging application, which forwards it to the payment application. In some embodiments, the server computer system directly sends the identification information of the recipient to the PSS.

In some embodiments, the second input is associated with a contact entry in a contacts list stored at the sender's mobile device. In such embodiments, the mobile messaging application searches the contacts list to determine identification information associated with the recipient, and forwards that information to the PSS.

In some embodiments, the mobile messaging application sends the entire text message to the messaging server, which performs the parsing and detection of the syntax. In such embodiments, the messaging server determines recipient's identification information and transmits the notification (along with the identification information) to the PSS. As used here, the identification information of the recipient ("recipient information") can be an identifier (e.g., an email address, a telephone number, a device ID, etc.) or other identifying information (e.g., mailing address).

Upon receiving the notification, the PSS (and/or the payment application based on instructions from the PSS) can cause a movement, or transfer, of money, based on information included in the notification, without requiring an explicit command (e.g., from the sender) to transfer the money; so long as the currency indicator is detected, the money transfer can be executed and/or triggered to be executed. To initiate the money transfer, the PSS can analyze information about the recipient identified in the TO field (e.g., based on phone number, email address, username, etc.). The information can be received from the messaging server and/or the messaging application to enable the PSS to identify the recipient and the recipient financial account of that recipient.

In some embodiments, the sender can indicate an intent to transfer money by including a second input in the TO field of the message; more particularly, the sender can specify a payment proxy in the TO field. For example, the user enters into the TO field "$redcross." In another example, the user enters into the TO field "$aaron." The second input operates as a unique identifier (ID) or an avatar that identifies the recipient without disclosing recipient's information, such as bank information, email address, etc. The recipient can also personalize a financial avatar for a foundation, organization, or business. Such financial avatar can be provided, for example, to one or more senders in a public space, e.g., via a webpage (e.g., Donate money by sending it to the $Foundation!" For example, the second input can be "$donatetoredcross" where recipient named Aaron may be requesting money for a Red Cross® project.

Once the user enters the payment proxy, or input having the syntax, into the TO field, composes a note for the message body, e.g., "Here is 10," and sends the message using the messaging application (e.g., by clicking "Send"), the process continues in a similar path as discussed above. That is, in some instances, the messaging application communicates the message to the messaging server, which performs the parsing and detection of the payment proxy in the TO field, and communicates at least a portion of the message to the PSS. In other instances, the messaging application performs the parsing to detect the syntax of the payment proxy in the TO field, and communicates at least a portion of the message to the payment application, which can then communicate with the payment service system for processing the money transfer. The portion of the message can include, for example, the parsed recipient identifier "redcross" and/or the numerical value of the money intended to be sent to the recipient (e.g., 10).

Upon receiving information about the money transfer request (e.g., from either the payment application or the messaging server), the payment service system can identify a recipient associated with the input that is derived from the TO field, and further identifies a recipient financial account associated with that recipient. In some embodiments, the PSS accesses a username database to identify for a database entry that matches the alphabetic portion of the second input, and determines whether that database entry is associated with payment card information that identifies a payment card of the recipient. Upon identifying the payment card based on the second input, the PSS causes funds to be transferred to the recipient financial account, where that financial account is associated with the identified payment card. The payment card can be, for example, a debit card, and the financial account can be, for example, a debit account associated with the debit card.

In some embodiments, if the PSS is unable to identify a database entry that matches the second input, the PSS sends a message to the mobile messaging application requesting identification information of the recipient. In some embodiments, the mobile message application, upon receiving the request from the PSS, prompts the sender to provide the identification information of the recipient. The mobile messaging application can then forward the identification information to the PSS, which sends a message, based on the identification information, to prompt the payment card information from the recipient. In some embodiments, the mobile messaging application communicates with a messaging server facilitating the mobile messaging application to obtain the identification information.

In some embodiments, the PSS itself communicates with the messaging server to obtain the recipient's identification information and/or the payment card information. In some embodiments, the PSS directly communicates with the messaging server to connect with the recipient for the payment card information. In such embodiments, the PSS sends a request to the messaging server to transmit a message to the recipient, where the message prompts the recipient to provide payment card information for processing the sender's requested money transfer. The message can include, for example, a link that can be accessed to redirect the recipient to a landing page, at which the recipient can submit the payment card information. The messaging server, based on the username of the recipient received from the PSS, can perform a database lookup to determine if that username is associated with identification information of the recipient (e.g., a device identifier ("device ID"), an application identifier ("app ID"), an email address, a telephone number, etc.). The server, based on the determined identification information, sends the message to the recipient to prompt for the payment card information. The message can be sent, for example, via an instant message within an instant messaging application executing on the recipient's computing device (e.g., a desktop computer or a mobile device such as a smartphone). In another example, the message can be sent via a push notification to the recipient's computing device.

In at least some embodiments, the cash tag technology can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The payment service system generates the landing page to enable the recipient to conveniently receive one or more payments from one or more senders.

In some embodiments, the personalized location address identifying the landing page is a uniform resource locator (URL) that incorporates the payment proxy. In such embodiments, the landing page is a web page. For example, the URL is www . . . com/CharityName, which identifies the landing page as a web page dedicated to collecting money for CharityName. In another example, the URL is www . . . com/$aaron. A sender can access the landing page, e.g., by entering the URL into a web browsing application installed, or executing, on the sender's client device. Upon navigating to the URL, the sender can simply enter a payment amount, e.g., in a web entry field, and send the money, e.g., by selecting a "Pay" action button displayed on the web page. In some embodiments, the URL can include a fixed payment amount, in addition to the payment proxy. For example, the URL is www . . . com/$CharityName$20. The fixed payment amount included in the personalized URL can be specified by the recipient, and designed to request that fixed amount from any sender that accesses the landing page identified by the URL.

In some embodiments, the landing page is identified by a graphical user interface (GUI) of a mobile payment application installed on a client device of the sender. The GUI can be dedicated to a main payment proxy, where there can be multiple GUIs each dedicated to a different payment proxy associated with that main payment proxy. For example, the sender can access the landing page by selecting, within a mobile payment service application, a GUI labeled with the payment proxy $CharityName representative of a charity group, and further select another GUI labeled $Research to make a donation to the Research subgroup at CharityName. For example, the sender can enter a payment amount at the $Research GUI and select a "Pay" action button displayed at that GUI.

Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other obvious features not described in detail herein. Additionally, some well-known structures or functions may not be shown or described in detail below, so as to avoid unnecessarily obscuring the relevant description.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Additionally, as used here, the term "parsing" refers to a process of analyzing a string of alphanumeric characters and/or symbols, for example, in a natural language. In accordance with the embodiments of the cash tag technology, the parsing can be performed context-free or context-aware to determine intent of users from a sentence or phrase (e.g., in text of messages). In particular, parsing enables deriving a sender's intent to transfer money by deconstructing a seemingly "innocent" (i.e., ordinary) message of the sender, such as "Here's $10," to mean, e.g., "Sender wishes to send $10." Such deconstruction can be coupled, optionally in some embodiments, with a creation of a hyperlink for the "$10" included in the message to enable money transfer by following the link. For example, interaction with the hyperlink indicates an approval for the PSS to initiate the money transfer. In another example, the hyperlink redirects the sender to a webpage for completing the money transfer with the PSS.

The message deconstruction involved in parsing can include analyzing the particular context involved in the message. For example, the message "Here's $10!" can be treated differently from "Hey, I got you covered—paid Betty $20 yesterday for next week's event!" based on an analysis of the context. By parsing with context, it can be derived that the prior message in the example would require a money transfer while the latter would not. The context (and intent) can be determined based on a statistical parsing model (e.g., learning machine). The model can rely on a 2corpus of training data to gather information about the frequency on which various constructions occur in specific contexts. Such frequency can be used to determine a probability of whether the intent derived from the text is accurate. For example, the probability of the user having such an intent can be measured based on whether the probability meets or exceeds an acceptability threshold. Furthermore, related messages (e.g., nearby messages posted by other users on the same forum, past messages composed by the same user in the past, nearby messages composed by other users within a geographical distance from the current user, etc.) can be utilized in making a context-based determination of the intent to transfer money.

The term "payment card," as used in the above examples and throughout the description, refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term "proxy card" as used herein refers to a card that bears a card number/account number that appears to be that of a real credit or debit card account (i.e., it is in the correct format), but where that card/account number is actually only a proxy for the customer's real card/account number. Additionally, the payment card used in the example above is a specific type of a financial instrument. Other types of financial instruments, other than the payment card, can be used to initiate the transfer of cash. An example of another type of a financial instrument is a biometrically identifiable instrument, such as a person's finger (e.g., for fingerprint recognition), face, iris or retina, heartbeat, etc. Alternatively, a financial instrument can be a software instrument or virtual instrument, such as a virtual wallet.

It is noted that while the sender in the embodiments discussed above uses a mobile device, in other embodiments, the sender may use a computing device other than a mobile device to utilize the cash tag technology, such as a conventional desktop computer. In such embodiments, the mobile messaging application can be replaced by a more conventional software application in such computing device, where the software application has functionality similar to that of the mobile messaging application as described in the above example scenario.

It is also noted that the cash tag technology is equally applicable in other embodiments to various other content providers and various other types of providers, such as financial service providers or to any application that involves communication of messages between users, and that the universal address technology is not limited to media channels and/or messaging applications. Furthermore, the cash tag technology can be implemented with other non-cash transfers, e.g., payment card points, airplane miles, etc., and is not limited to transfers of money.

Moreover, the cash tag technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Turning now to the Figures, FIG. 1 illustrates an example of a network-based environment 100 in which some embodiments of the cash tag technology can be implemented. The embodiments illustrated in FIG. 1 include a client device 102, a computer server system 104 of a third-party web content provider ("web server 104"), a computer server system 106 of a third-party application service ("application server 106"), and a computer server system 110 of a payment service ("payment service system 110" or "PSS 110"), all of which are in communication over a communication network 108. In some embodiments, the PSS 110 includes one or more servers 112 and an Application Programming Interface API 114 ("API 114"). The one or more servers 112 are typically equipped with, or is coupled to, one or more databases 116 ("DB 116"), which can include one or more hard drives, a centralized or distributed data cluster, a cloud-storage service provider, or other suitable storage systems suitable for storing digital data.

It should be noted that in other embodiments, the environment 100 can have more or fewer components than shown, or a different configuration of components. The various components shown in FIG. 1 can be implemented by using hardware, software, firmware or a combination thereof, including one or more signal processing and/or application specific integrated circuits. Further, the environment 100 of FIG. 1 can be implemented based on other architectures in other embodiments. For example, in some embodiments, the API 114 can exist separately from the PSS 110, e.g., as part of the web server 104 or the application server 106, or as a standalone server (e.g., a standalone API server in communication with the web server 104, the application server 106, and the servers 112). In another example, in some embodiments, functions of at least some of the servers can be consolidated.

The network 108 can include any combination of local area and/or wide area networks, using both wired and wireless communication systems. In some embodiments, the network 108 uses standard communications technologies and/or protocols. Thus, the network 108 can include links using technologies such as Ethernet, 802.11, worldwide interoperability for microwave access (WiMAX), 3G, 4G, CDMA, digital subscriber line (DSL), etc. Similarly, the networking protocols used on the network 108 may include multiprotocol label switching (MPLS), transmission control protocol/Internet protocol (TCP/IP), hypertext transport protocol (HTTP), and/or file transfer protocol (FTP). Data exchanged over the network 108 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The client device 102 can be any processing device capable of receiving user input as well as transmitting and/or receiving data via the network 108. In some embodiments, the client device 102 can be a conventional computer system (e.g., a desktop 102A or a laptop computer 102B) or a mobile device having computer functionality (e.g., a tablet device 102C, a smartphone 102D, or a conventional mobile phone (not shown)). The client device 102 typically includes a display that can be used to display a user interface, and may include suitable input devices (not shown for simplicity) such as a keyboard, a mouse, or a touchpad. In some embodiments, the display may be a touch-sensitive screen that includes input functionalities.

The client device 102 can be configured to communicate via the network 108 with the web server 104 and/or the application server 106. In some embodiments, the client device 102 can retrieve or send information to the web server 104 and/or the application server 106, and run one or more applications with customized content retrieved from the web server 104 or the application server 106. For example, the client device 102 can execute a browser application to enable communication between the client device 102 and the web server 104 (e.g., to access a social networking website). In another example, the client device 102 can execute a customized client to enable communication between the client device 102 and the application server 106. For example, the customized client is a messaging application operated by a messaging server. The customized client can further provide a channel of communication between respective client devices of a sender user 140 ("sender 140") and a recipient 142 ("recipient 142") (e.g., a channel that enables transmission of one or more electronic messages including, e.g., text, audio, and/or video). For example, the customized client enables an instant exchange of electronic messages between the respective client devices. Other example messaging applications and/or messaging servers can include an email application and email server or a social networking messaging application and a social networking server.

In accordance with various implementations of the cash tag technology, the sender 140 can utilize a given client device 102 to trigger a money transfer to a recipient 142. For example, by accessing a landing page with the client device 102, the sender 140 can submit an amount of money to the recipient 140 that is associated with the landing page. In another example, the sender 140, using the client device 102, can transmit a message to the recipient (e.g., via a chat application or a forum), where that message includes an indication of an intent of the sender 140 to send money to the recipient through use of a specified syntax for one or more inputs in that message. The recipient 142 can similarly use another given client device 102 to receive the money, for example, by interacting with a confirmation link sent to the client device of the recipient 142 as a result of the money transfer triggered by the sender 140.

The web server 104 can host a website (hereinafter, "system website") that includes one or more graphical user interfaces (GUIs) for organizing and presenting content to users. For example, through the system website, users create account logins to connect to their social identities (e.g., social profiles or social accounts or shopping accounts), read content (e.g., messages, comments, posts), create or post content, communicate in real-time with other users (e.g., chat, post messages, comment on posts, etc.), and/or otherwise engage or interact with other users of the system website (e.g., "friends," "followers," "social contacts," or other types of social network connections). In some embodiments, the user interactions on the system website lead to internal API communication, which involves the web server 104 monitoring the user interactions for an indication of an intent to transfer money, e.g., by parsing messages at the system website. In response to such indication, the web server 104 can transmit one or more requests (e.g., POST or GET requests) to the API 114 of the server(s) 112 to query the database(s) 116, and display the data returned by the API 114 of the server(s) 112 as appropriate. The web server 104 can determine the indication of the intent based on an identification of a user input, e.g., a string of characters, that has a particular syntax, the syntax being a monetary indicator preceding one or more alphanumeric characters. The user input having the syntax operates as a trigger to send money to a particular recipient (e.g., recipient 142). The recipient can be identified based on a user input with the syntax (i.e., payment proxy represented by the user input), or based on a user account of a user currently accessing the system website (e.g., login credentials).

In one example, the web server 104 monitors user messages on the system website for any particular message that includes a user input having the syntax of the monetary indicator preceding the alphanumeric characters, and forwards a request to the API 114. In such an example, the web server 104 can identify the syntax by parsing the user messages to find, for example, a message that includes the syntax, and further parses that message to identify a payment amount and a payment proxy, and forwards such information to the API 114 and/or the server 112 to process the money transfer. In some embodiments, the web server 104 parses the user messages simply to identify any message with input(s) having the syntax, and forwards that message to the server 112 via the API 114. In such embodiments, the server 112 can receive the message and can parse it for a payment proxy (i.e., one or more alphabetic characters of the user input having the syntax) to identify a recipient associated with the payment proxy. Upon identifying the recipient, the server 112 can identify an associated recipient financial account, and initiate a money transfer to that recipient financial account. In some embodiments, the API 114 (e.g., instructed by the server 112) can also send back, in a response to the web server 104, appropriate data for display to the user. For example, the data is an HTML string that displays a confirmation message with a link for prompting the sender to confirm his/her intent to transfer money to the recipient associated with the payment proxy. In some embodiments, the server 112 sends a confirmation message to the sender using information included in the request received from the web server 104, e.g., an identifier associated with the sender. For example, the identifier can be an email address of the user, and the server 112 (e.g., via an email server) sends an email message to the user's email address.

The application server 106 supports an application (hereinafter, "system application") that includes one or more graphical user interfaces for organizing and presenting content to users. The system application can be a mobile application installed on a mobile device or a conventional software application installed on a conventional personal computer. Users can utilize the system application to interact with other users. The system application can be a messaging application. For example, through the system application, users create account logins to connect to their social identities (e.g., social profiles or social accounts or shopping) to communicate with other social identities, read messages, create or post messages, communicate in real-time with other users (e.g., chat), and/or otherwise engage or interact with other users of the system application (e.g., "friends," "social contacts," or other types of social network connections). In some embodiments, the user interactions on the system website lead to internal API communication, which involves the application server 106 monitoring the messages for an indication of an intent to transfer money, e.g., by parsing messages at the system application. In response to such indication, the application server 106 can transmit one or more requests (e.g., POST or GET requests) to the API 114 of the server(s) 112 to query the database(s) 116, and display the data returned by the API 114 of the server(s) 112 as appropriate. In some embodiments, it is the system application that performs the parsing. Upon identifying the syntax, the system application can notify the application server 106 of the indication of the intent to transfer money. Alternatively, in some embodiments, the system application notifies a payment service application executing on the user's device of the indication, where that payment service application communicates with the servers 112 via the API 114.

In one example, the system application monitors at the user device (e.g., client device 102 of the sender 140) for any particular message that includes a user input that has the syntax of the monetary indicator preceding the alphanumeric characters. Upon identifying such a message, the system application notifies the application server 106, which transmits a request to the API 114 that includes, e.g., the message and an identifier associated with a creator of the message (e.g., an email address), for the API 114 and/or the server 112 to process the money transfer. In such an example, the server 112 can parse the message for a payment proxy (i.e., the user input having the syntax) to identify a recipient associated with the payment proxy. Upon identifying the recipient and an associated recipient financial account, the server 112 initiates a money transfer to that recipient. In some embodiments, the system application communicates with a payment service application executing at the user's device via an API call (e.g., through API server 114). The payment service application can then further parse the identified message having the syntax to identify an amount of money for the transfer and a recipient for the transfer (e.g., payment proxy). The payment service application can communicate this information to the server 112 (e.g., via the API server 114), which processes the money transfer based on this information. In some embodiments, the payment service application forwards the message to the server 112, which performs the additional parsing to identify the amount of money and the recipient.

In some embodiments, the API 114 (e.g., instructed by the server 112) can also send back appropriate data relating to the money transfer for display to the user at the system application. For example, the data includes text that can be incorporated in, e.g., a push notification, that displays a confirmation message with an action link for the user to confirm his/her intent to transfer money to the recipient associated with the payment proxy. In some embodiments, the server 112 sends a confirmation message to the user using information included in the request received from the application server 106, e.g., an identifier associated with the user. For example, the identifier can be a telephone number of the user, and the server 112 sends a text message to the user's phone number.

The PSS 110 can be a cloud computing environment, a virtualized computing environment, a computer cluster, or any combination thereof. The PSS 110 includes a payment processor (not shown) configured to process money transfers conducted between a sender and a recipient identified by a payment proxy. As discussed briefly above, the PSS 110 includes the one or more servers 112. The payment processor can be a part of the one or more servers 112, and can work in coordination with the API 114 to exchange requests and responses with the Web server 104, the application server 106, and/or the payment service application associated with the PSS to process one or more transactions triggered by use of the syntax (e.g., money transfers). The one or more servers 112 can handle secure transactions (e.g., using a secure server), to process all payment transactions triggered.

In general, the servers 112 store secure information such as credit card numbers, debit card numbers, bank accounts, user accounts 118, e.g., payment proxies associated with users, user identifying or profile information, financial account information, or other sensitive information. Each user account 118 can be associated with one or more card accounts of the user, e.g., debit or credit card accounts. A card account can be a financial account managed by a card issuer (e.g., a card issuer 132) and can be associated with the card number. In some embodiments, the one or more card accounts are stored at the server 112 (e.g., at the DB 114). Generally, the card issuer issues physical payment card for each card account.

In some embodiments, the PSS 110 includes a payment service application server (e.g., a server of the servers 112) that supports a payment application for executing various services provided by the PSS (hereinafter, "payment service application"). The payment service application includes one or more graphical user interfaces for presenting content and processing user requests. The payment service application can be a mobile application (i.e., "mobile payment application") installed on a mobile device or a conventional software application installed on a conventional personal computer. For example, through the payment service application, users create account logins to utilize financial services offered by the PSS 110, to link their financial accounts with the payment service system 110 (e.g., registration with the PSS 110), to transfer money using their user accounts and/or financial accounts, and/or otherwise engage with the services offered by the PSS 110 via the payment service application.

To process payment transactions, the PSS 110 can communicate with one or more financial networks. In some embodiments, the PSS 110 can communicate with a computer system 120 of a card payment network, e.g., a debit card payment network (e.g., STAR or PULSE) or a credit card payment network (e.g., Visa® or MasterCard®), (collectively, "card payment network 120"). In some embodiments, the PSS 110 can communicate with the card payment network 120 over the same network 108, or a different network. In one example, the card payment network 120 can communicate, in turn, with the computer system 122 of a sender card issuer, e.g., a bank, and a computer system 124 of a recipient card issuer, e.g., a same or different bank. The sender card issuer 122 and the recipient card issuer 124 can transfer money, e.g., over a debit payment network, in response to a request to transfer money from the PSS 110.

In some embodiments, the PSS 110 can communicate with a computer system 130 of an Automated Clearing House (ACH) network. The computer system 130 of the ACH network can communicate with a sender bank account 132 and a recipient bank account 134. The sender bank account 132 and the recipient bank account 134 can transfer money, e.g., using the ACH network, in response to a request to transfer money from the PSS 110. In other embodiments, there can also be computer systems of other entities, e.g. the card acquirer, between the PSS 110 and the card issuers, and between the PSS 110 and the bank accounts.

In accordance with various embodiments, a payment transaction (e.g., a transferring of money) can originate at a device of the sender 140 ("sender device"), such as the desktop 102A. For example, the sender 140 can initiate a payment transaction by using the sender device to access and/or interact on a forum, such as a microblog hosted by the web server 104. Alternatively, the sender 140 can initiate, for example, the payment transaction by using the sender device to access a landing page that is associated with a personalized URL, which incorporates a payment proxy of the recipient 142. In another example, the sender 140 can initiate a payment transaction by using a sender device to access an application such as a messaging application supported by the application server 106. In yet another example, a user can initiate a payment transaction by using a sender device to access an application such as the payment service application supported by the PSS 110.

The PSS 110 can process the payment transaction on behalf of the user. Processing the payment transaction involves identifying a financial account of a sender user and a financial account of a recipient user (e.g., by accessing the DB 116 of the PSS 110).

In accordance with various embodiments of the disclosed technology, the financial account of the recipient user can be identified based on a payment proxy associated with the recipient user. For example, the recipient user may have previously created a payment proxy (e.g., $redcross) to be used with a service provided by the PSS 110 (e.g., a money transfer service), and entered financial account information through a GUI (e.g., an interactive payment receiving interface) of the payment service application of the PSS 110. In this example, the PSS 110, in turn, associates the financial account information with the recipient user's newly created payment proxy in this registration process. In other words, upon submission of information by the recipient user, the PSS 110 automatically registers the financial account and the payment proxy with the PSS 110 on behalf of the recipient user. The recipient user can submit financial account information for one or more financial accounts. Associations of the one or more financial accounts with the recipient user's payment proxy can be stored on the PSS 110 (e.g., DB 114). Information of the financial accounts can be used for future payment transactions (e.g., money transfers).

In accordance with various embodiments of the disclosed technology, the financial account of the sender user can be identified based on identifier associated with the sender user ("sender identifier"). In some embodiments, the PSS 110 can receive the sender identifier from the Web server 104 or the application server 106. In some embodiments, the PSS 110 receives the sender identifier from the payment service application supported by the PSS 110.

The PSS 110 can identify a financial account of the sender user based on an association between that financial account and the sender identifier. For example, the sender user may have previously received payment (e.g., from another sender user) and entered financial account information through a GUI of the payment service application of the PSS 110 (e.g., an interactive payment receiving interface). In such an example, the PSS 110 may have identified the sender identifier of the sender user (e.g., via email sent to the sender user or text message). In turn, the PSS 110 stores the financial account information in association with the sender identifier newly created by virtue of accepting the payment from the other sender user (using the service provided by the PSS 110). The sender user can submit financial account information for one or more financial accounts. Associations of the one or more financial accounts with the sender identifier can be stored on the PSS 110 (e.g., DB 114). Information of these financial accounts can be used for future payment transactions (e.g., money transfers).

If no financial account information is identified for either the sender user or the recipient user, the PSS 110 can send a message (e.g., a financial account request message) to the respective user requesting that financial account information to be submitted. The message can be a confirmation message that includes a secure link to enter the financial account information, such as a debit card number or a credit card number and associated authentication information (e.g., expire date, ZIP Code, PIN number, or security code). For example, the respective user can simply input financial account information, such as a debit card number or a credit card number.

When the financial account information is identified for both the sender user and the recipient user (either initially or later submitted through the confirmation message), the PSS 110 sends a request to transfer money, e.g. via the card payment network 120 or the ACH network 130. In particular, to transfer money between the sender user and the recipient user (identified based on the payment proxy), the PSS 110 can operate as a gateway or a middleman.

To operate as a gateway, the PSS 110 can identify debit card accounts, e.g. stored at the servers 112, for both the sender user and the recipient user. The PSS 110 can submit a request to an appropriate card issuer e.g., to the sender user's card issuer or to the receiving user's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middleman, the PSS 110 can receive a payment amount by processing a card, e.g., a credit card or a debit card, of the user sender and hold the payment amount. The PSS 110 can push the payment amount, e.g., over debit rails, to a debit account of the recipient user. Instead of holding the payment amount, the PSS 110 can also forward the payment once the recipient user links the account with the PSS 110. Alternatively, the PSS 110 can generate a transaction ACH that debits an amount from the sender bank account and can credit the amount into a recipient bank account, e.g., using ACH, or onto a debit account, e.g., over debit rails, of the recipient user.

Figure 2:
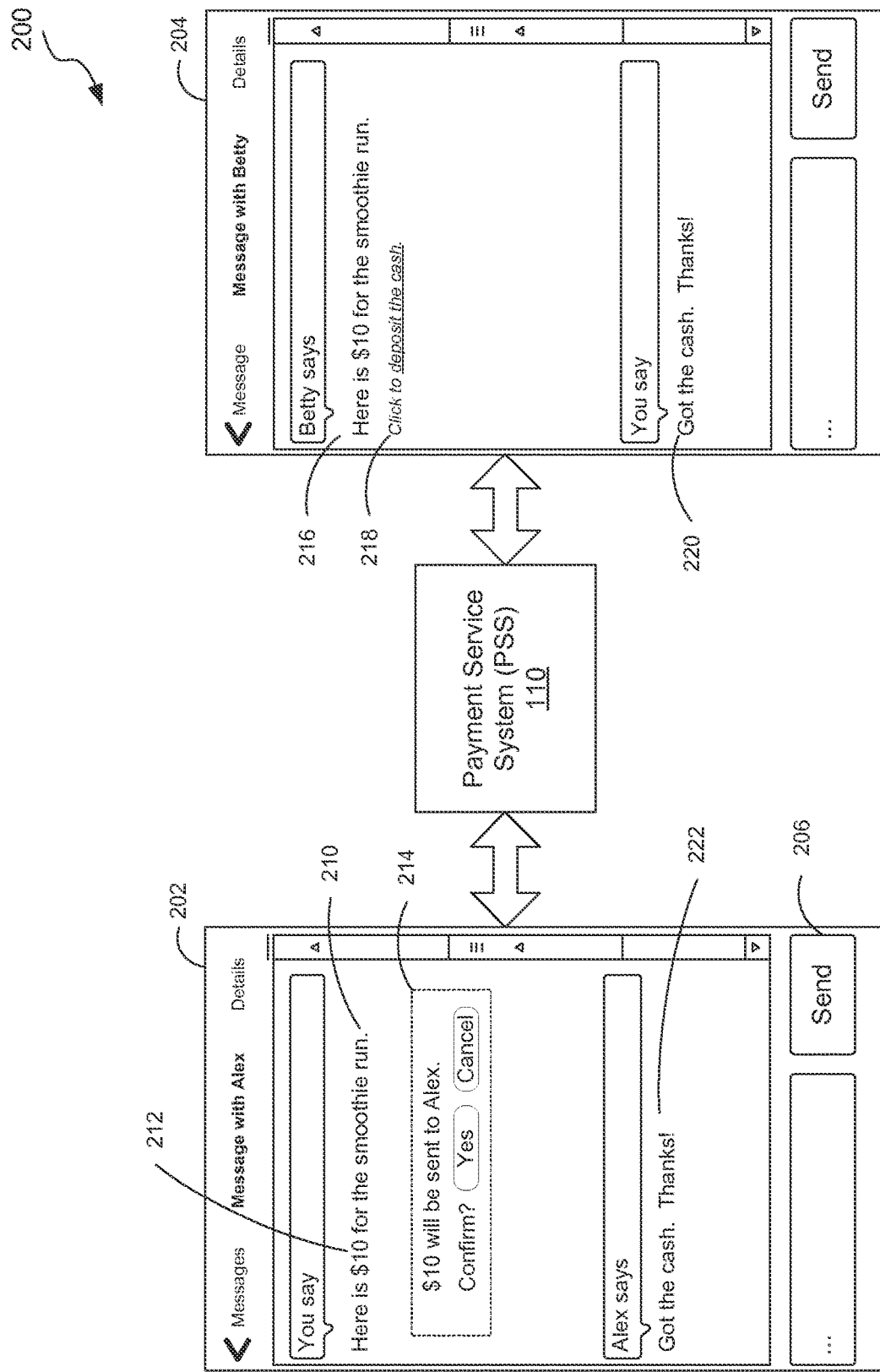
FIG. 2 illustrates a data flow diagram of an overview of a money transfer process by use of a payment proxy within a forum context.

FIG. 2 illustrates a data flow diagram of a first example money transfer process 200 within a messaging application context, in accordance with some embodiments. The money transfer flow 200 begins at an instance of an instant messaging application 202 executing on a mobile device (e.g., smartphone) of a sender user (or simply, "sender") named "Betty."

The sender inputs a first message 210 to be sent to another user, or a recipient, named "Alex," who can receive the first message 210 on another instance of the instant messaging application (i.e., instant messaging application 204) executing on his mobile device. The message 210 includes one or more inputs from the sender (e.g., "Here is $10 for the smoothie run"). The sender can interact with an action button 206 (e.g., "Send") on a user interface output by the mobile device (e.g., based on instructions from the application 202) to send the message 210. The instant messaging application 202 can parse the message 210 and detect that the message 210 includes an input 212 that contains "$10", where the input 212 has a specified syntax of a monetary currency indicator prefixing an alphanumeric character; that is, the input 212 includes the currency indicator "$" and two numeric characters "1" and "0."

The instant messaging application 202, in response to detection of the input 212 having the syntax, generates a message 214 for display to the sender. The message 214 prompts a confirmation from sender that she wants to send an amount of money indicated in the message 210 (e.g., $10) to the recipient of the message 210 (i.e., "Alex"). The sender can initiate the money transfer to the recipient by selecting the "Yes" option displayed in the message 214.

In some embodiments, the PSS 110 causes the message 214 to be generated in response to a detection of the input 212. In such embodiments, the instant messaging application 202 first communicates a detection of the syntax in the message 210 to a mobile payment application executing on the sender's mobile device. For example, the messaging application 202 causes a notification to be sent to the mobile payment application to notify such detection of the syntax in the input 212. The notification can include information about the sender and the recipient of the message 210 (e.g., user ID, device ID, application ID, instant messaging username, etc.) and/or any other information about the message 210. The mobile payment application can then communicate with the PSS 110 to execute, or trigger execution, of a money transfer based on this information received from the messaging application 202. In some embodiments, before executing the money transfer, the PSS 110 sends a message to the mobile payment application to instruct the instant messaging application 202 to generate the message 214.

In some embodiments, the instant messaging application 202 sends the notification to a remote server facilitating the instant messaging application 202 (i.e., a messaging server), which communicates the notification to the PSS 110 (e.g., via an API call). The PSS 110, upon receiving the notification from the messaging server, communicates with the messaging server to instruct, or otherwise cause the instant messaging application 202 to generate the message 214. In some embodiments, the instant messaging application 202 sends the notification directly to the PSS 110, which then sends an instruction to the instant messaging application 202 to generate the message 214.

In some embodiments, the instant messaging application 202, upon receiving an indication to send the message 210 from the sender (e.g., based on interaction with the action button 206), transmits the message 210 to the messaging server. The messaging server then parses the message 210 to detect the syntax and notifies the PSS 110. The PSS 110 can then cause the message 214 to be displayed at the mobile device (e.g., by establishing communication links with the mobile device through either the messaging server or the mobile payment application that would communicate with the messaging application 202). In an event where the messaging server does not detect any input having the syntax, the messaging server can proceed to process transmission of the message 210 in accordance with typical messaging protocols.

Upon receiving the confirmation from the sender for the message 214, the instant messaging application 202 sends the message 210 to the recipient (i.e., Betty), as indicated by message 216 displayed at the instant messaging application 204 installed on the recipient's mobile device. In particular, the messaging application 202 can communicate the confirmation with the messaging server, which forwards the message 210 as message 216 displayed at the recipient's mobile device. In some embodiments, the instant messaging application 202 also communicates the confirmation with the PSS 110. For example, the instant messaging application 202 can communicate with the messaging server (e.g., via an API call), which then communicates the confirmation to the PSS 110 (e.g., via another API call). In another example, the instant messaging application 202 communicates with the mobile payment application (e.g., through an API call to the mobile payment application); the mobile payment application in turn can communicate with the PSS 110 through another API call about the confirmation.

The message 216 can further include a message 218, which can notify the recipient that the sender has sent money and instruct the recipient on how to deposit that money (e.g., via a hyperlink). For example, the hyperlink included in the message 218 can redirect the recipient to a landing page, such as a webpage. An example of such a landing page is displayed in a graphical user interface 1102 of FIG. 11. Message 220 is an example of a message input by the recipient Betty to reply to the sender Alex notifying him that she has received the ten dollars. Message 222 is an example of the message received from the recipient.

Figure 3:
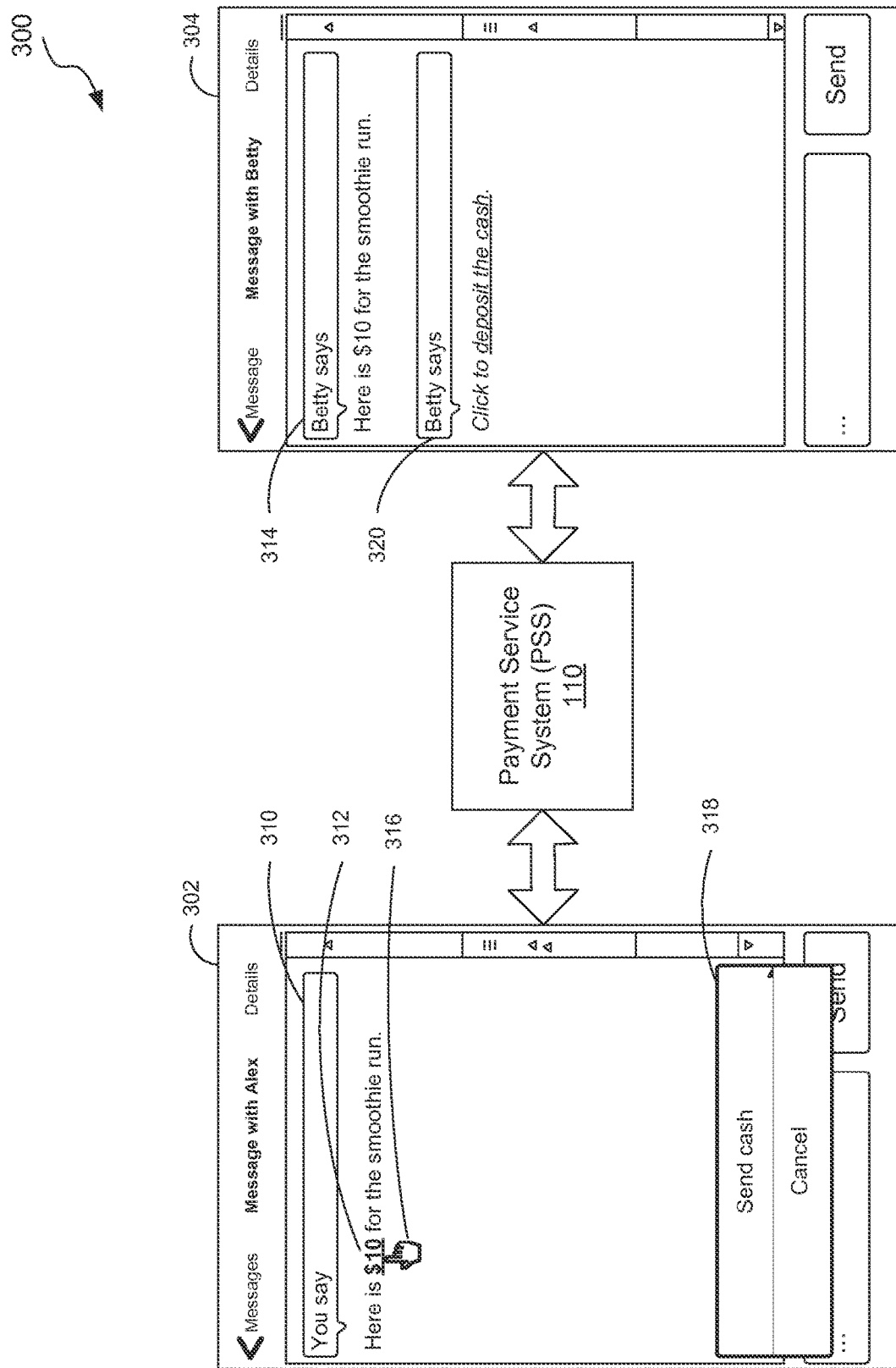
FIG. 3 illustrates a data flow diagram of an overview of a money transfer process by use of a payment proxy within a messaging application context.

FIG. 3 illustrates a data flow diagram of a second example money transfer process 300 within a messaging application context, in accordance with some embodiments. The money transfer flow 300 begins at an instant messaging application 302 installed on a mobile device (e.g., smartphone) of a user, or a sender, named "Betty."

The sender inputs a first message 310 to be sent to another user, or a recipient, named "Alex," who can receive the first message 310 on another instant messaging application 304 executing on his mobile device. The message 310 includes one or more inputs from the sender. The instant messaging application 302 detects (e.g., based on parsing the message 210) that the message 310 includes an input 312 that contains "$10", where the input 312 has a syntax of a monetary currency indicator "$" prefixing one or more numeric characters "10." In contrast with the first example money transfer process 200 in the embodiments discussed in reference to FIG. 2, in the embodiments of FIG. 3, the second money transfer process 300 involves the instant messaging application 302 transmitting the message 310 to the recipient upon submission by the sender (e.g., sender interacts with an action button by clicking "Send"), as opposed to generating a message prompting for confirmation (e.g., message 214 of FIG. 2).

The recipient can receive the message 310 as the message 314 displayed by the instant messaging application 304. In some embodiments, the instant messaging application 302 causes at least a portion of the input 312 to be emphasized on a user interface for the sender upon detection of the syntax in the input 312 (e.g., bolded or highlighted text indicative of a monetary amount for money transfer). With the emphasis, the instant messaging application 302 can also associate a selection action 316 with a monetary amount represented by the emphasized portion of the input 312. The sender can initiate the money transfer by interacting with the selection action 316 to confirm intent to transfer money (e.g., click or touch the emphasized portion as displayed on the user interface). Accordingly, such confirmation via the selection action 316 triggers a process to transfer an amount that is associated with the selection action 316 (e.g., 10 dollars).

In response to the selection action 316, the instant messaging application 302 can generate a message 318 to prompt the sender for confirmation. The message 322 can be a "pop-up" message or webpage that disappears upon selection of an action button by a viewer (e.g., the recipient). For example, the sender can select a "Send cash" action button included in the message 322 to confirm the sender's intent to send money by submitting the input 312. Alternatively, the sender can select a "Cancel" action button included in the message 322 to cancel any initiation of the money transfer. The placement of the pop-up message is for discussion purposes only and may or may not be proximal to the last sent or received message.

Upon receiving the confirmation from the sender, the instant messaging application 302 sends a message 320 to the recipient (i.e., Betty) displayed at the instant messaging application 304. In some embodiments, upon receiving the confirmation, the instant messaging application 302 first transmits, via a communications network, a message regarding the confirmation to the messaging server. The messaging server can then communicate, via a same or different communication network, with the PSS 110 regarding the confirmation received from the sender. The PSS in turn can transmit a return message to the messaging server, where the return message is configured to cause the messaging server to transmit the message 320 to the recipient's mobile device at the instant messaging application 304. In other embodiments, the instant messaging application 302, upon receiving the confirmation (e.g., via interaction with the message 318), communicates with the mobile payment application executing on the sender's mobile device. The mobile payment application then communicates with the PSS 110, which in turn, sends a return message to the mobile payment application. The return message is configured to cause the mobile payment application to instruct the instant messaging application 302 to transmit the message 320 to the recipient's mobile device for display at the instant messaging application 304.

In some embodiments, the message 320 can be a pop-up message, as opposed to a message within the instant messaging application as shown the embodiment of FIG. 3. The message 320 further includes a hyperlink that redirects the recipient to a landing page, such as a webpage. An example of such a landing page is displayed in a graphical user interface 1102 of FIG. 11.

Figure 4:
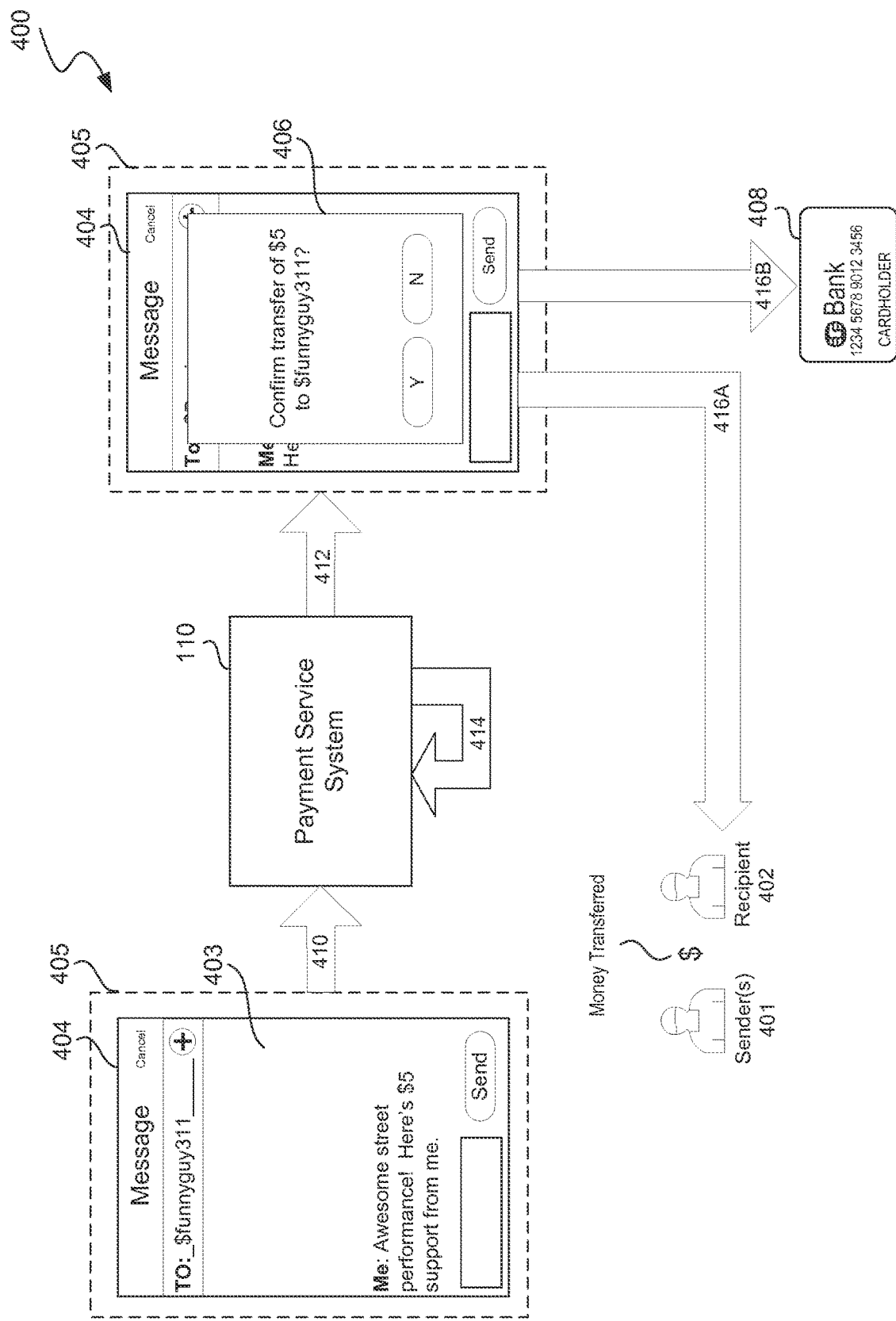
FIG. 4 illustrates a data flow diagram of an overview of a money transfer process by use of a payment proxy within a landing page context.

FIG. 4 illustrates a data flow diagram of a third example money transfer process 400 that utilizes a payment proxy within a messaging application context, in accordance with some embodiments of the cash tag technology. The process 400 involves communication between a messaging application 404 installed on a client device of the sender 401 (e.g., smartphone 102D of FIG. 1), a computer server system 405 of the messaging application 404 ("messaging application system 405"), and the PSS 110. The messaging application system 405 can be, or may include, the application server 106 of FIG. 1 that is employed by, e.g., a messaging service associated with a telephone company, a messaging service associated with a native operating system associated with the sender's client device, or an instant messaging service associated with a cross-platform messaging service. Note that while the process 400 is described for a particular sender sending money to the recipient 402, in other embodiments, the process 400 can be executed for multiple senders (e.g., sender 401 1-N, where N is an integer greater than 1), where each sender can send money to the recipient 402 through the set of operations involved in the process $00. In such embodiments, the individual payment amounts from the multiple senders 401 1-N can be aggregated into an accumulated payment amount that gets transferred, by the PSS 110, to the recipient 402.

In operation, the messaging application 404 (along with the messaging application system 405) works in coordination with an API associated with the payment service system 110 to monitor the communication messages created via the messaging application 404. The communication messages can be, for example, text messages, user-to-user chat messages, or group chat(room) messages. In particular, the messaging application 404 monitors these communication messages to detect an indication of an intent to transfer money from a particular user (e.g., the sender 401) to a particular recipient (e.g., the recipient 402). The messaging application 404 detects the indication of the intent based on an identification of a syntax, or more specifically, an input, within any of the communication messages, that has a particular syntax. In some embodiments, the detection can be based on a parsing of the messages to identify the syntax. As discussed above, the syntax includes a monetary indicator preceding one or more alphanumeric characters. The input having the syntax is representative of a payment proxy to which the sender 401 wishes to send money.

In the embodiments illustrated in FIG. 4, the process 400 relates to a text message 403 created by the sender 401. The message 403 includes, within a body of the message 403, the input "Awesome street performance! Here's $5 support from me." Further, the sender 401 inputs, into a TO field of the message 403, a string of characters to indicate to whom the sender 401 wishes to send the message 403. Note that the sender 401 may not have any personal relationship with the recipient 402, and as such, may not know a phone number, an email address, or any other personal contact information of the recipient 402. However, the sender 401 can send money to the recipient 402 by simply specifying, in the message 403, the payment proxy associated with the recipient 402. The recipient 402 can "advertise" or otherwise display his payment proxy to be seen by the sender 401, e.g., on a website (e.g., personal homepage), on a cardboard sign while he is conducting a street performance, etc. The sender 401, who wishes to send money to the recipient 402, e.g., as support for the street performance, can use the displayed payment proxy to send money.

In some embodiments, the sender 401 can send a blank message to the recipient 402 using the payment proxy associated with the recipient 402. In such embodiments, the blank message can be configured to correspond to a default transaction amount; that is, when a message, with the payment proxy included, is sent without any further e.g., comments in the body of the message, the default transaction amount is transferred to the recipient. The default amount for a blank message can be configured by a user. For example, a sender who has set the default amount is $50, can contribute to the ALS organization by inputting $ALS and hit "Send." As a result, the default $50 amount is automatically transferred to the ALS. In another example, the sender can utilize the preconfigured default amount with transactions for products or services that have fixed costs. For example, the sender can set the default amount to be $20 as she often visits a salon with typical fixed charge of $20; the next time the sender is at the salon, she can simply input $KSalon and $20 is automatically sent without requiring any personal note in that message (i.e., no need to specify context or amount).

In some embodiments, the body of the message could be self-populated with the amount based on past transactions or conversation history between the sender and the recipient (and/or other contacts). In such embodiments, a notification can be generated to prompt the sender to confirm addition of the self-populated amount. The various rules of the default amount can be preconfigured by the sender and/or a system admin, and stored in the database.

Note, the identity of the sender in the message received by the recipient may be displayed as anonymous in some embodiments. In some embodiments, the identity of the sender is displayed using a predefined identifier. The predefined identifier can be the "real" identity of the sender, e.g., the sender's actual payment proxy, actual name, actual user account name, actual email address, and/or any other actual avatar of the sender. Alternatively, the predefined identifier can be any identity preselected by the sender, e.g., a temporary made-up username, a "junk" email address usually used by the sender, etc. Concealment of the sender's identity can be implemented using encryption to map the sender's real identity (e.g., payment proxy of the sender or any other avatar) to a "concealed" address before passing it on to the recipient at the recipient's device.

Similarly, the recipient 402 can configure different identities to be associated with his/her payment proxy for payment processing. Among other benefits, such capability enables the recipient 402 to have a layer of different payment proxies to avoid giving the "real" address of a division of finances. In particular, the recipient can receive money at a payment proxy A, and be able to divide, or distribute, the money received among 3-4 divisions or payment proxies unbeknownst to the sender. For example, the recipient associated with the payment proxy "$funnyguy311" can configure a rule that, for every $100 received, $50 is distributed to another payment proxy e.g., $funnyguy_bandmate. In another example, for donations to a recipient 402 with payment proxy $ALS, the money can be distributed evenly between $research and $awareness, as soon as the payment is received from the sender 401.

Upon an indication to send (e.g., user interaction with the action button "Send" displayed within a GUI of the messaging application 404), the messaging application system 405 receives the message 403 from the messaging application 404, and identifies that the message 403 includes an input that has the syntax. In particular, the messaging application system 405 parses the TO field of the message 403 to identify the input having the syntax. For example, the input having the syntax is a string of characters that includes the monetary indicator preceding multiple alphabetic characters and multiple numeric characters (e.g., "$funnyguy311"). The input having the syntax is representative of a payment proxy.

Identification of the payment proxy in the TO field of the message 403 triggers the messaging application system 405 to forward the message 403 to the PSS 110 (e.g., via API 116 of FIG. 1), as indicated by block 410. In particular, the messaging application system 405 sends a notification message to the PSS 110 that includes the message 403 and other data associated with the message 403 and/or the sender 401 who has created/sent the message 403. The other data, or information, can include, for example, a sender identifier associated with the sender 401. Such an identifier can include, for example, a phone number of the sender 401 (e.g., the phone number of the sender device used to send the message 403 (e.g., a text message)), and/or an email address of the sender 401 (e.g., the email address registered with the sender device used to send the message 403). In some embodiments, the sender identifier can be derived from a user account registered with the messaging application system 405 (e.g., a chat ID, a cellular account, etc.).

In some embodiments, upon receiving the notification message that includes the sender identifier, the PSS 110 communicates with the messaging application system 405, as indicated by block 412, to cause a confirmation message 406 to be displayed at the sender device of the sender 401, by using the sender identifier. The confirmation message 406 includes a confirmation link in the form, e.g., of an action button, to enable the sender 401 to confirm the money transfer. Upon receiving a confirmation from the sender 401 (e.g., via the messaging application 404 and the messaging application system 405), the PSS 110 proceeds to blocks 416A and/or 416B. In some embodiments, the PSS 110 proceeds to blocks 316A and/or 316B without sending the confirmation message 406. In such embodiments, the PSS 110 proceeds to blocks 416A and/or 416B without having to receive the confirmation back from the sender 402.

In some embodiments, upon receiving the notification from the messaging application system 405, the PSS 110 parses the message 403, and more specifically, the TO field of the message 403 to identify the payment proxy (and the recipient to whom money is to be transferred), as indicated by block 414. Note that, in such embodiments, the messaging application 404 and/or the messaging application system 405 may parse the TO field only partially, and upon identifying the syntax, forwards some or all of the information about the message 403 to the PSS 110 for further analysis (e.g., further parsing of the TO field). By parsing the TO field associated with the message 403, the PSS 110 can identify a recipient financial account based on the identified payment proxy. In some embodiments, the PSS 110 identifies the recipient financial account by accessing the DB 114 of FIG. 1, which maintains data relating to user accounts and associated financial accounts in one or more database tables. In such embodiments, the PSS 110 utilizes the parsed text associated with the payment proxy (e.g., the alphanumeric characters of "funnyguy311") to find a mapping of a financial account with the parsed text. In particular, the PSS 110 can perform a database lookup to determine who is the recipient associated with the payment proxy (e.g., Is there a user of the PSS 110 that is associated with the payment proxy $funnyguy311?).

For example, the PSS 110 searches one or more database tables of the DB 116 corresponding to, e.g., funnyguy311 or $funnyguy311. An example of the database tables are shown in FIG. 9 (e.g., database tables 902, 904, and 906). Within the database tables of the DB 116, the recipient user account can be represented by an identifier associated with the recipient. The identifier can include, for example, an email address, a telephone number, an application ID, a device ID, or biometric data (e.g., fingerprint, iris, voice, facial features, etc.) In some embodiments, the recipient user account is the payment proxy.

Upon identifying the recipient user account, the PSS 110 identifies the recipient financial account associated with that user account. In some embodiments where the recipient user account is the payment proxy, the PSS 110 simply identifies the recipient financial account without first identifying the recipient user account registered with the PSS 110. To identify the recipient financial account, the PSS 110 can determine the financial account information that identifies that recipient financial account. The financial account information can include, for example, card number, expiration date, CVV, billing address, etc.

If the PSS 110 is able to identify the recipient financial account, the PSS 110 can proceed to identify the sender financial account, if not identified already. Once both financial accounts are identified, the PSS 110 can cause a payment amount to be transferred from the financial account associated with the sender 301 to the financial account associated with the recipient 402, as indicated by block 416A.

If the PSS 110 is unable to identify the recipient financial account, the PSS 110 can send a message to request financial account information from the recipient 402 (e.g., a confirmation message that includes a financial account request message), as indicated by block 416B. The message can be sent to the recipient 402 by using an identifier of the recipient ("recipient identifier") that is stored in association with the recipient user account (and/or in association with the payment proxy). The recipient identifier can include, for example, an email address or a telephone number of the sender, the recipient, or a representative of the recipient or sender. For example, the PSS 110 sends an email message to an email address of the recipient 402, where the email message includes a hyperlink that redirects the recipient 402 to, e.g., a webpage that allows submission of financial account information, such as the debit card information associated with a debit card, such as a debit card 408. An example of such an email message is shown in FIG. 10B. In another example, the PSS 110 sends a text message to a telephone number of the recipient 402, where the text message includes a hyperlink similar to the one included in the example email message. An example of a webpage for submitting financial account information is shown as the user interface 1102 in FIG. 11. Alternatively, the sender 401 can submit the financial information of the recipient 402 that the sender 401 has acquired from the recipient at some point. For example, the sender 401 may have had a verbal exchange of financial information with the recipient 402. The recipient 402 may have verbally provided, for example, a routing number or account number in that verbal exchange. In another example, the sender 401 may have a (paper or electronic) copy of a check (e.g., void check or check to pay for another transaction) from the recipient 402. The sender 401 can acquire, for example, the routing number and/or an account number from that check.

The PSS 110, upon notification (i.e., block 410), also determines who is the sender 401, and more specifically a financial account of the sender 401 ("sender financial account") to process the money transfer, as indicated by block 414. The PSS 110 can identify the sender 402 by using the other information, such as the sender identifier, included in the notification message from the messaging application system 405. In particular, the PSS 110 accesses the database 114, which maintains data on user accounts and associated financial accounts in one or more database tables, to identify whether, e.g., the email address of the sender 401, exists in the database 114. Upon finding the sender identifier, the PSS 110 determines the sender financial account. Note that the sender 401 may not already have an account with the PSS 110, but would still be able to transfer money to the recipient by use of the payment proxy. In such scenario where the sender 401 is not yet known to the PSS 110, the PSS 110 sends a message (e.g., a confirmation message of the sender 401's intent to transfer money) to request for financial account information of a financial account, e.g., as indicated by block 416B. The sender financial account can be associated, for example, with a payment card, such as a debit card 408, or credit card. In some embodiments, the confirmation message can be sent at block 412 as discussed above.

In addition to identifying the sender financial account and the recipient financial account, the PSS 110 also determines a payment amount that the sender 401 desires to send to the recipient 402. The PSS 110 can determine the amount by analyzing the message 203 to identify a second input that has the syntax of the monetary indicator preceding one or more alphanumeric characters. In particular, the PSS 110 parses the message 403 to identify the second input representative of the payment amount. The second input can be a string of characters that includes the monetary indicator and one or more numeric characters. For example, the amount can be identified based on the input, "$5," included in the message 403. In some embodiments, the PSS 110 can determine the amount by analyzing the message 403 to identify an input that includes one or more numeric characters, without the input having the syntax. For example, the PSS 110 parses the message 403 to identify the amount based on an identification of the input "5." In some embodiments, the amount can be parsed from the message 403 based on natural language processing and/or context of the message 403.

Once both the sender financial account and the recipient financial account are identified (or received by the PSS 110 via the confirmation message), the PSS 110 proceeds with block 416A to initiate a transfer of money. Initiating the money transfer can include, for example, the PSS 110 communicating a request to a card issuer of the sender 401 to transfer the money. In another example, the PSS 110 processes a card of sender 401, e.g., a credit card or a debit card, holds the payment amount on behalf of the recipient 402, and can forward the payment amount to the recipient 402 once a financial account has been linked with the PSS 110. Alternatively, the PSS 110 can generate a transaction using ACH that debits an amount from a bank account of the sender 401 and can credit the amount into a bank account of recipient 402, e.g., using ACH, or onto a debit account, e.g., over debit rails, of the recipient 402.

In some embodiments, the PSS 110 sends a confirmation message to a user (e.g., a sender) to obtain a confirmation, even if the financial account of the user has already been identified, before the PSS 110 sends the request to transfer money, e.g., the card network or the ACH network. In such embodiments, the confirmation message operates as a safety measure to ensure that it is the user that wishes to participate in the money transfer. This can be beneficial, for example, for the sender 401 who may have inadvertently triggered the money transfer, may have entered the incorrect payment proxy (e.g., $funnyguy311 versus $funnyFunGuy), and/or may have changed his/her mind and wishes to cancel the money transfer. On the other hand, the recipient 402 may also benefit from receiving a confirmation message, for example, to verify who has sent money and/or to decline the money from the sender 401.

Figure 5:
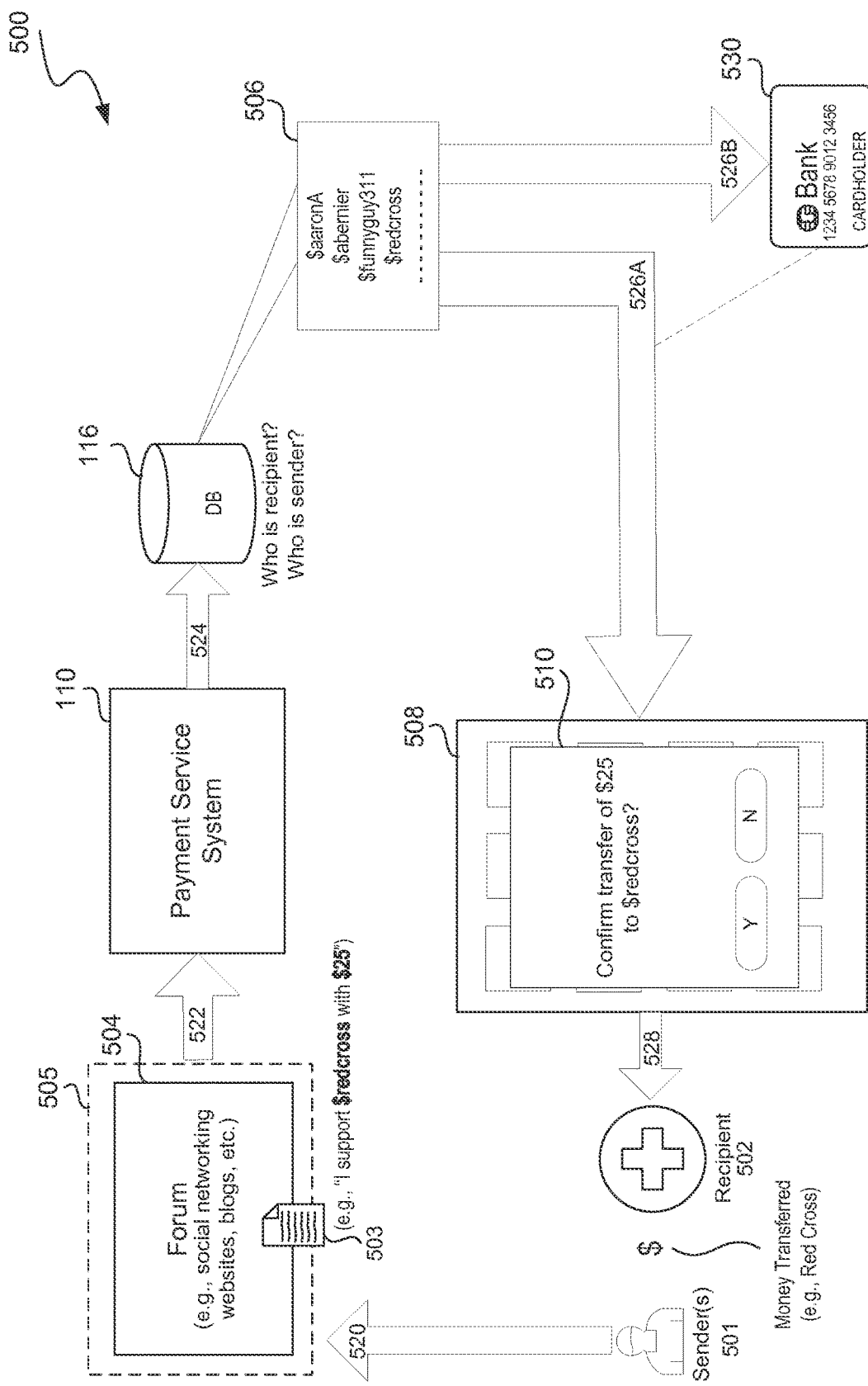
FIG. 5 is a flowchart illustrating an example process of transferring money by use of a payment proxy.

FIG. 5 illustrates a data flow diagram of an overview of a money transfer process 500 between a sender 501 and a recipient 502, by use of a payment proxy within a forum context, in accordance with some embodiments of the disclosed technology. The process 500 involves communication between a computer system 505 of a forum 504 ("forum system 505") and the PSS 110. The forum system 505 can be, or include, the Web server 104 of FIG. 1, that is employed by a content provider. The content provider can include social networking, blogging, or microblogging services. In some embodiments, the forum may also refer to an application or webpage of an e-commerce or retail organization that offers products and/or services. Such websites can provide an online "form" to complete before or after the products or services are added to a virtual shopping cart. The online form may include one or more fields to receive user interaction and engagement. Some of these fields may be configured to receive payment information, such as a payment proxy, in lieu of payment card mechanisms, such as credit cards, debit cards, prepaid cards, gift cards, virtual wallets, etc.

Note that while the process 500 is described for a particular sender sending money to the recipient 502, in other embodiments, the process 500 can be executed for multiple senders (e.g., sender 501 1-N, where N is an integer greater than N), where each sender can send money to the recipient 502 via the set of operations involved in the process 500. In such embodiments, the individual payment amounts from the multiple senders can be aggregated into an accumulated payment amount that gets transferred, by the PSS 110, to the recipient 502.

The process 500 starts with the sender 501 accessing the forum 504, or website, executed or hosted by the forum system 505, as indicated by block 520. The website can be, for example, a social networking website, a microblog, a blog, or any other media channels that enable communication between users of the website. In some embodiments, the forum system 505 authenticates the sender 501 before allowing access. Authentication can involve, for example, verifying login credentials submitted by the sender 501, e.g., by using a sender device of the sender 501, such as the client device 1028, to the forum system 505. The login credentials can be a username and password that correspond to a user account registered with the forum system 505. In some embodiments, the username can be an email address or a phone number of the sender 501, where such username can operate as a sender identifier of the sender 501. In some embodiments, the sender identifier is submitted in addition to a username and is stored by the forum system 505 in association with the username for the newly created user account registered with the forum 504.

In operation, the forum system 505 works in coordination with an API associated with the PSS 110 to monitor the content made or created by the users of the forum 504. The content can include, for example, user messages, posts, comments, user interactions, etc. (hereinafter, "user messages," for ease of discussion of the process 500). In particular, the forum system 505 monitors the user messages to detect an indication of an intent to transfer money from a particular user (e.g., the sender 501) to a particular recipient (e.g., the recipient 502). The forum system 505 detects the indication of the intent based on an identification of a syntax, or more specifically, an input, within any one of the user messages, that has a particular syntax. In some embodiments, the detection can be based on a parsing of the user messages to identify the syntax. In some embodiments, any syntax in a form field dedicated for a payment proxy can be identified as intent. As discussed above, the syntax includes a monetary indicator preceding one or more alphanumeric characters. The input having the syntax is representative of a payment proxy at which the sender 501 wishes to send money. The input can be a string of characters that include the monetary indicator and one or more alphabetic characters. For example, the input is $redcross. In another example, the input is $aaron. The input can be a string of characters that include the monetary indicator and one or more alphabetic characters and numeric characters. For example, the input is $redcross123. In another example, the input is $aaron315.

The sender 501, for example, accesses a social networking website and posts a message 503, "I support $redcross with $25," on the social networking website (e.g., a social profile page of the sender 501 or another user). The Web server 104 can identify the sender user's intent to transfer money to the recipient user 502 based on an identification of the payment proxy "$redcross" included in the posted message 503. Note that the sender 501 may not have any personal relationship with the recipient 502, and as such, may not know a phone number, an email address, or any other personal contact information of the recipient 502. However, the sender 501 can send money to the recipient 502 by simply specifying, in the message 503, the payment proxy associated with the recipient 502. The recipient 502 can "advertise" or otherwise display a payment proxy of the recipient 502 to be seen by the sender 501, e.g., on a website (e.g., personal homepage), on a billboard, on a pamphlet, on a flyer, etc. The sender 501, who wishes to send money to the recipient 502, e.g., as support for the recipient 502, can use the displayed payment proxy to send money.

Referring back to the process 500, upon identification of any message that includes an input having the syntax, the forum system 505 sends a notification message (e.g., an API request) to the PSS 110, as indicated by block 522. The notification message can include the identified user message and any other data associated with the user message and/or the user who has created that user message (e.g., the sender 501). The other data, or information, can include, for example, a sender identifier associated with the user. Such identifier can include, for example, an email address of the sender 501 or a phone number of the sender 501. As discussed above, the sender identifier can be derived from a user account registered with the forum system 505.

Upon receiving the notification, the PSS 110 parses the user message to identify the input having the syntax (i.e., the payment proxy), and more specifically, to identify who is the recipient of the money transfer, as indicated by block 524. Based on the payment proxy, the PSS 110 can identify a recipient financial account. In some embodiments, the PSS 110 identifies the recipient financial account by accessing a database, e.g., the DB 116, which maintains data 506 relating to user accounts and associated financial accounts in one or more database tables. In such embodiments, the PSS 110 performs a database lookup to determine who is the recipient associated with the payment proxy (e.g., Is there a user of the PSS 110 that is associated with the payment proxy $redcross?). For example, the PSS 110 searches one or more database tables of the DB 116 for, e.g., $redcross. An example of the database tables storing the data 506 is shown in FIG. 9 (e.g., database tables 902, 904, and 906). Within the database tables of the DB 116, the recipient user account can be represented by an identifier associated with the recipient. The identifier can include, for example, an email address, a telephone number, an application ID, a device ID, or biometric data (e.g., fingerprint, iris, voice, facial features, etc.) In some embodiments, the recipient user account is the payment proxy.

Upon identifying the recipient user account, the PSS 110 identifies the recipient financial account associated with that user account and proceeds to process the transaction, as indicated by block 526A. In some embodiments where the recipient user account is the payment proxy, the PSS 110 simply identifies the recipient financial account without first identifying the recipient user account registered with the PSS 110. To identify the recipient financial account, the PSS 110 can determine the financial account information that identifies that recipient financial account. The financial account information can include, for example, card number, expiration date, CVV, billing address, routing number, etc. The recipient financial account can be associated with, for example, a debit payment card 530.

Figure 11:
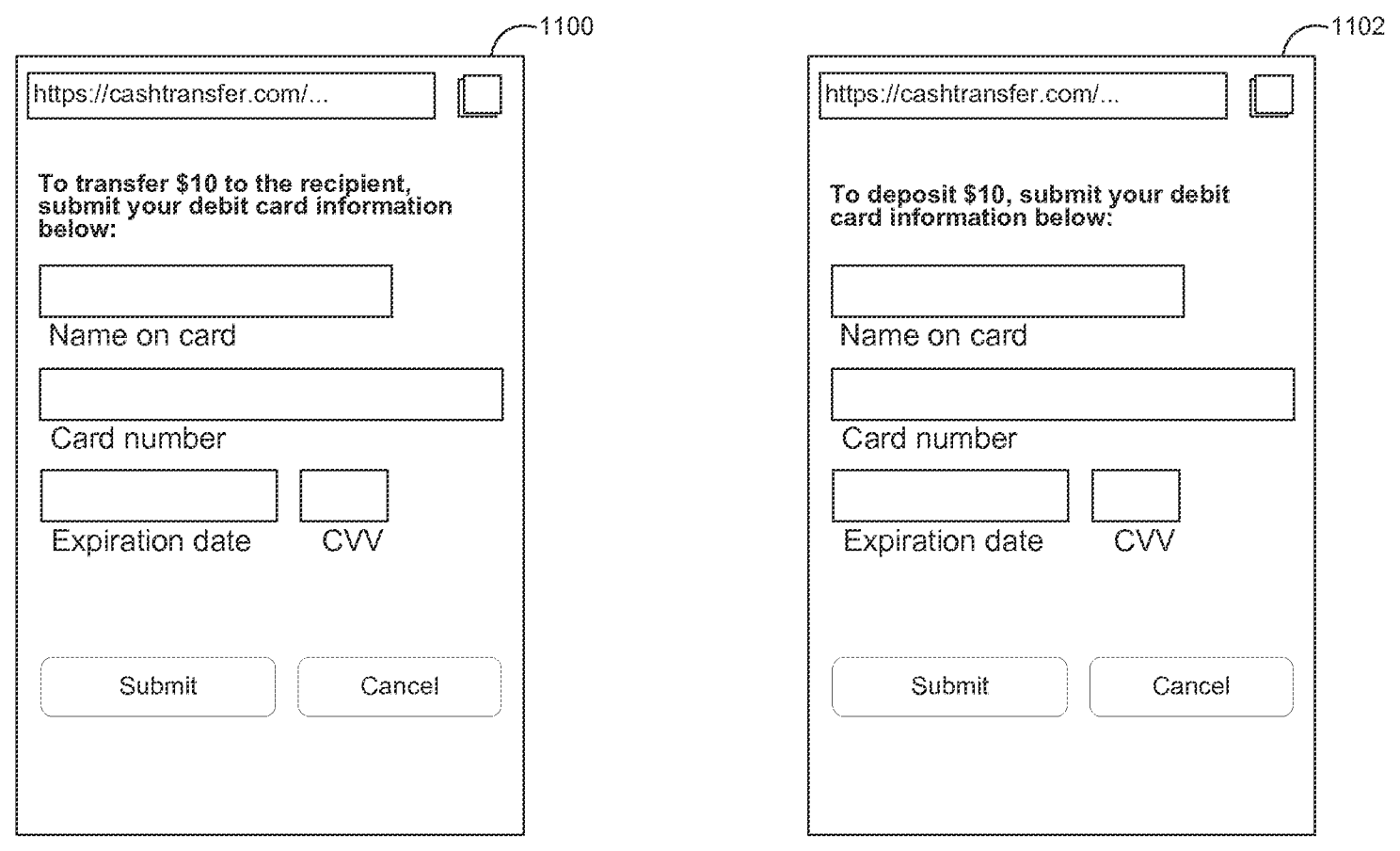

If the PSS 110 is unable to identify the recipient financial account, the PSS 110 can send a message to request financial account information from the recipient 502 (e.g., a confirmation message that includes a financial account request message), who can provide financial account information (e.g., debit card information), as indicated by block 526B. The message can be sent to the recipient by using an identifier of the recipient ("recipient identifier") that is stored in association with the recipient user account (and/or in association with the payment proxy). The recipient identifier can include, for example, an email address or a telephone number. For example, the PSS 110 sends an email message to an email address of the recipient 502, where the email message includes a hyperlink that redirects the recipient 502 to, e.g., a webpage that allows submission of debit card information associated with the debit card 530. An example of such an email message is shown in FIG. 10B. In another example, the PSS 110 sends a text message to a telephone number of the recipient 502, where the text message includes a hyperlink similar to the one included in the example email message. An example of a webpage for submitting financial account information is shown in FIG. 11.

The PSS 110, upon notification, also determines who is the sender 501 (as indicated by block 324), and more specifically a financial account of the sender 501 ("sender financial account") to process the money transfer. The PSS 110 can identify the sender 502 by using the other information, such as the sender identifier, included in the notification message from the forum system 505. In particular, the PSS 110 accesses the database 116, which maintains data 506 about user accounts and associated financial accounts in one or more database tables, to identify whether, e.g., the email address of the sender 501, exists in the database 116. Upon finding the sender identifier, the PSS 110 determines the sender financial account. Note that the sender 501 may not already have an account with the PSS 110, but would still be able to transfer money to the recipient 502 by use of the payment proxy. In such scenario where the sender 501 is not yet known to the PSS 110, the PSS 110 sends a message (e.g., a confirmation message of the intent of the sender 501 to transfer money) to request for financial account information, as indicated by block 526B. The financial account information identifies a sender financial account, which can be associated, for example, with a payment card, such as the debit card 530.

In addition to identifying the sender financial account and the recipient financial account, the PSS 110 also determines a payment amount that the sender 501 desires to send to the recipient 502. The PSS 110 can determine the amount by analyzing the message 503 to identify a second input that has the syntax of the monetary indicator preceding one or more alphanumeric characters. In particular, the PSS 110 parses the message 503 to identify the second input representative of the payment amount. The second input can be a string of characters that includes the monetary indicator and one or more numeric characters. For example, the amount can be identified based on the input, "$25," included in the message 503. In some embodiments, the PSS 110 can determine the amount by analyzing the message 503 to identify an input that includes one or more numeric characters, without the input having the syntax. For example, the PSS 110 parses the message 503 to identify the amount based on an identification of the input "25." In some embodiments, the amount can be parsed from the message 503 based on natural language processing and/or context of the message 503.

Once both the sender financial account and the recipient financial account are identified (or submitted to the PSS 110 via the confirmation message), the PSS 110 proceeds at block 526A to initiate a transfer of money. Initiating the money transfer can include, for example, the PSS 110 communicating a request to a card issuer of the sender 501 to transfer the money. In another example, the PSS 110 processes a card of sender 501 e.g., a credit card or a debit card, holds the payment amount on behalf of the recipient 502, and can forward the payment amount to the recipient 502 once a financial account has been linked with the PSS 110. Alternatively, the PSS 110 can generate a transaction using ACH that debits an amount from a bank account of the sender 501 and can credit the amount into a bank account of the recipient 502, e.g., using ACH, or onto a debit account, e.g., over debit rails, of the recipient 502.

In some embodiments, initiating the money transfer includes sending a confirmation message to a user to obtain financial account information from that user. In such embodiments, the PSS 110 may not have the financial account information of both the sender 501 and the recipient 502. The PSS 110 can send to the user a confirmation message that includes a confirmation link that redirects the user to a page (e.g., a web page or a GUI of an application) that contains a form, e.g., a web form with fields, that the user can submit the financial account information. Once the financial account information is received, the PSS 110 can cause money to be transferred, e.g., by sending a request to an appropriate card issuer, or by processing a card, or by using ACH (as discussed above).

If the sender financial account information cannot be identified, the PSS 110 can send the confirmation message to the sender 201. For example, the PSS 110 sends the confirmation message to the sender 501 by using a sender identifier, e.g., an email address received from the forum system 505. The confirmation message includes a confirmation link that prompts the sender 501 to confirm the intent to transfer money to the recipient 502 (identified based on association with the payment proxy included in the message 503). An example of such a confirmation message is shown in FIG. 10A. The sender 501 can confirm by engaging with the confirmation link. For example, the confirmation link is a URL link that redirects the sender 501 to a web form with fields that prompts the sender 501 to submit financial account information in order to confirm the money transfer to the recipient 502. In such an example, the sender 501 can engage with the URL link by clicking and entering the financial account information into the web form, e.g., via a touch screen display, a mouse, or any other input/output device of a sender device of the sender 501. An example of such a web form is shown as the user interface 1100 in FIG. 11.

If the recipient financial account information cannot be identified, the PSS 110 can send the confirmation message to the recipient 502. For example, the PSS 110 sends the confirmation message the recipient 502 using a recipient identifier stored in association with the payment proxy, e.g., an email address. The confirmation message includes a confirmation link that prompts the recipient 502 to accept the money transfer from the sender 501 (identified based on a sender identifier associated with the message 503). An example of such a confirmation message is shown in FIG. 10B. The recipient 502 can confirm by engaging with the confirmation link. For example, the confirmation link is a URL link that redirects the recipient 502 to a web form with fields that prompts the recipient 502 to submit financial account information in order to confirm the money transfer from the sender 501. In such an example, the recipient 502 can engage with the URL link by clicking and entering the financial account information into the web form, e.g., via a touch screen display, a mouse, or any other input/output device of a sender device of the sender 501. An example of such a web form is shown in FIG. 11.

In some embodiments, the PSS 110 sends a confirmation message 510 to a user simply to obtain a confirmation, even if the financial account of the user has already been identified. In such embodiments, the confirmation message 510 operates as a safety measure to ensure that it is the user that wishes to participate in the money transfer. This can be beneficial, for example, for the sender 501 who may have inadvertently triggered the money transfer, may have entered the incorrect payment proxy (e.g., $redcross versus $red4cross), and/or may have changed his/her mind and wishes to cancel the money transfer. On the other hand, the recipient 502 may also benefit from receiving a confirmation message, for example, to verify who has sent money and/or to decline the money from the sender 501.

Figure 6:
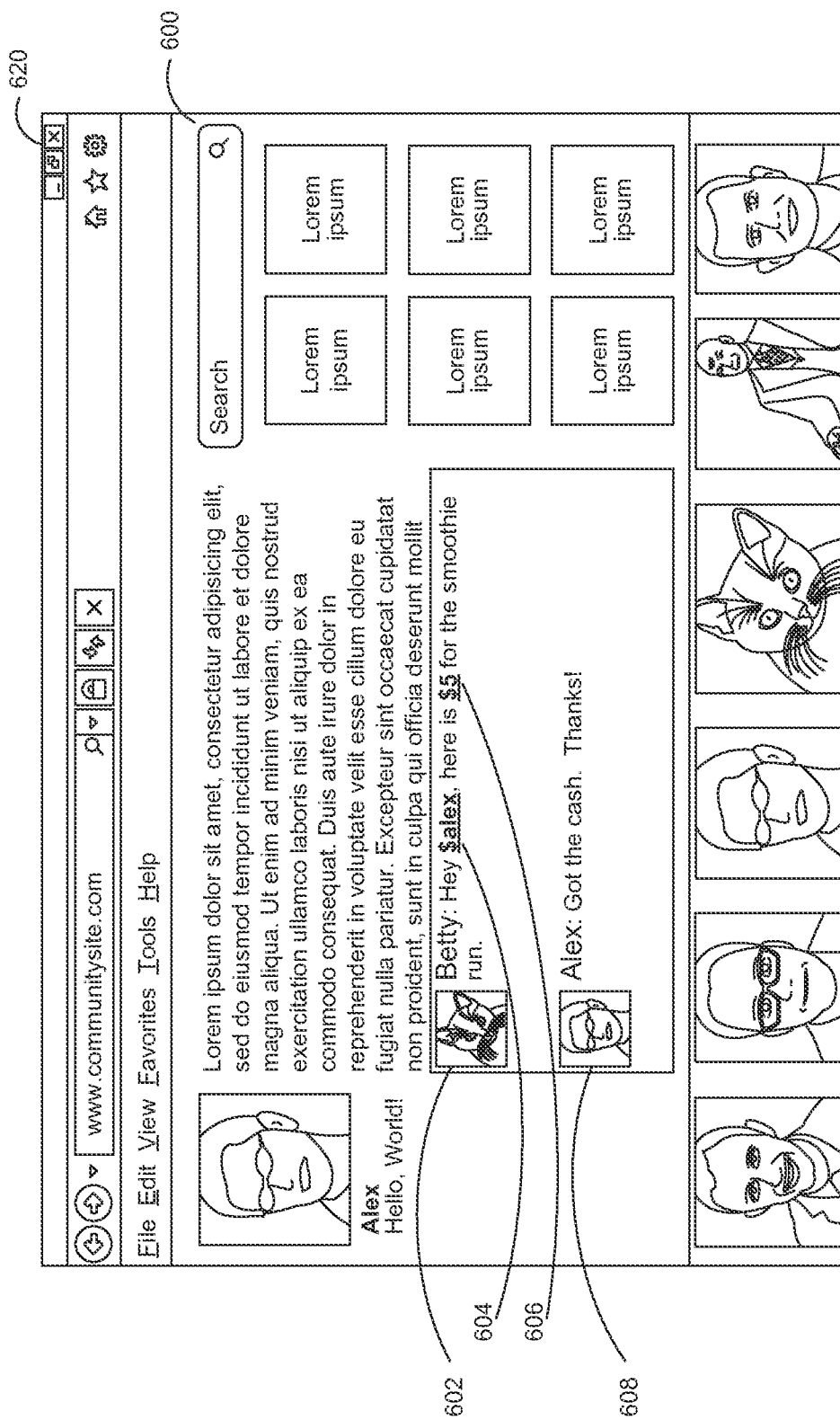
FIG. 6 is a flowchart illustrating an example process of linking a card account for a transfer of money by use of a payment proxy.

FIG. 6 is a user interface diagram illustrating an example interface 600 relating to a money transfer flow associated with the cash tagging technology, in accordance with some embodiments. The interface 600 can be generated by a web browser application 620 that is used for accessing content of one or more websites via the Internet. The interface 600 can display content of a website (e.g., "www.communitysite.com") that hosts, or operates as, an online communication platform for, e.g., an electronic bulletin boards or an online social networking service. In the embodiment of FIG. 6, the interface 600 displays content of a homepage of a user account of a user "Alex." The content displayed at the interface 600 includes a first message 602 electronically posted, or written, by a user "Betty." The message 602 includes, among others, a first input 604 and a second input 606, where each of the first and second inputs 604, 606 contains a specified syntax of a monetary currency indicator (e.g., "$") prefixing one or more alphanumerical characters. In particular, the first input 604 includes the monetary currency indicator prefixing a set, or string, of alphabetic characters (i.e., "alex"), and the second input 606 includes the monetary currency indicator prefixing a numeric character (i.e., "5").

The web browser application 620, upon detecting the first input 602 and the second input 604 having the specified syntax, communicates (either directly or indirectly) with a PSS (e.g., the PSS 110 of FIG. 1) to initiate a transfer of funds. In response to a communication from the web browser application 620, the PSS can process the transfer of funds by determining who is the sender of the funds, who is the recipient of the funds, and what is the amount to be transferred. The PSS can identify the amount based on the second input 606. In particular, the PSS can parse the second input 606 to determine the amount from the one or more numerical characters included in the second input 606.

In some embodiments, the PSS can identify the sender and the recipient, respectively, based on identification information received via the web browser application 620. In such embodiments, the web browser application 620 can communicate with a server computer system (not shown) that hosts the website content displayed in the interface 600. The server computer system can respond by transmitting user profile information associated with the user (e.g., "Betty" or "Alex") to the PSS, where the user profile information is part of account information maintained by the server computer system. The user profile information can include the identification information, which can be, for example, an email address, a telephone number, a username. In some embodiments, the PSS can utilize that information to reach out to the user (e.g., "Betty" or "Alex") for payment card information to process the request to transfer funds. The PSS, for example, can generate a message that includes a hyperlink to redirect the user to a landing page to submit payment card information (e.g., interfaces 500 and 502 of FIG. 5). In some embodiments, the PSS can identify the recipient based on the first input 604 (i.e., "$alex"). In such embodiments, the PSS can perform a database search to determine if the first input 604 matches with a user account associated with the PSS.

Upon a successful processing of the request to transfer funds, the PSS can notify the recipient. For example, the recipient can receive an email message from the PSS. In another example, the PSS can cause a message to be displayed at a home page of a user account associated with the web browser application 620 (e.g., homepage of the user "Betty" or the user "Alex"). The content of the interface 600 includes a second message 608 posted by the user, or recipient, "Alex." The second message 608 can be an example of a message the recipient can post to notify the sender that the five dollars has been successfully deposited into his financial account.

Note that while the message 602 indicates the user Betty wishes to send money to a recipient according to the embodiment of FIG. 6, in other embodiments, the user Betty, for example, can post a similar message to request (as opposed to send) money from another user, e.g., user Alex. In such embodiments, the user Betty can post, for example, a message stating "$alex, pls send me $5 for the smoothie run. Thanks!" In this example, the PSS can process the money transfer request from Betty upon receiving notification of the detection of the first input of "$alex" and the second input of "$5" included in the message.

Figure 7:
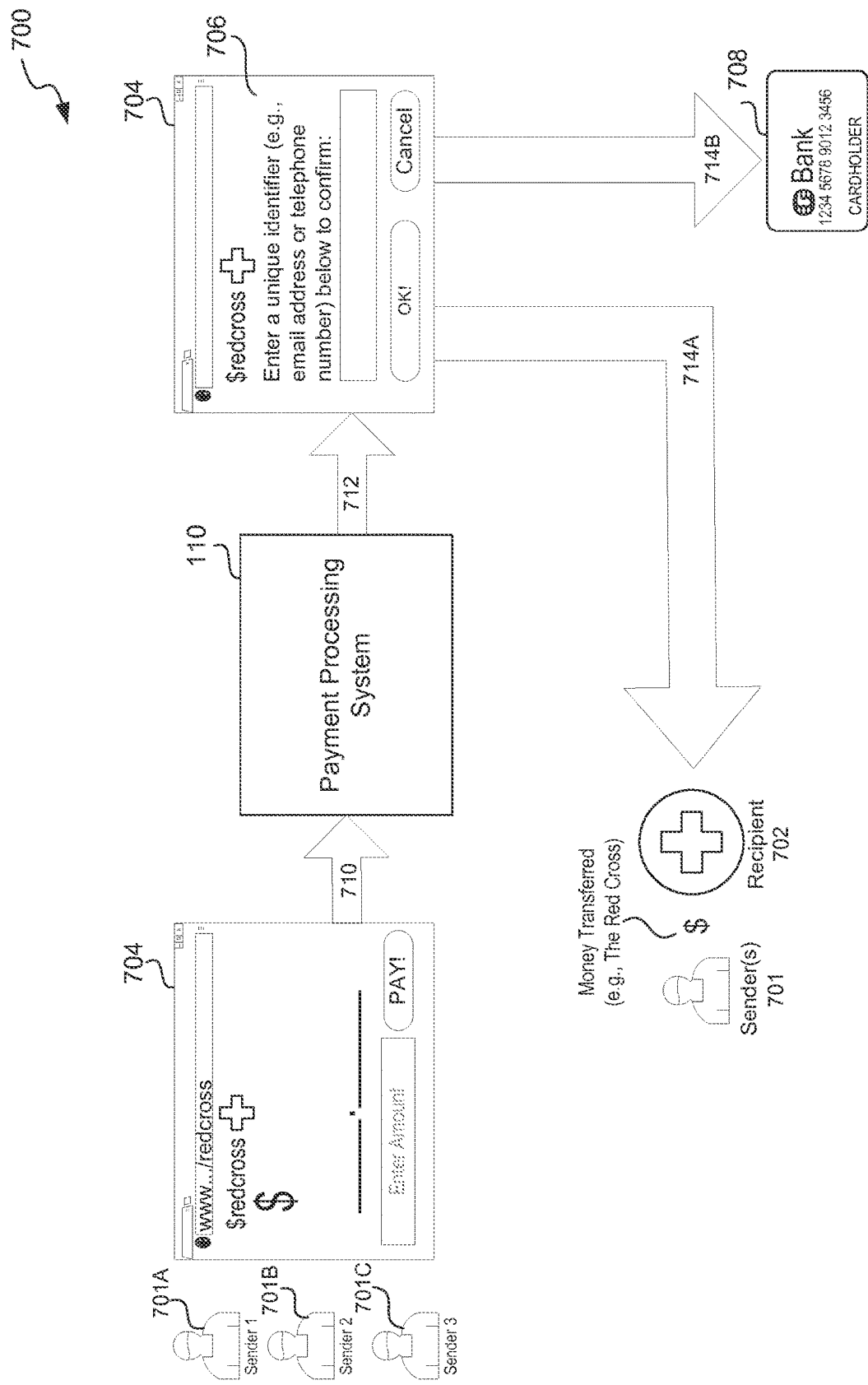
FIG. 7 is a flowchart illustrating an example process of transferring money within a landing page context.

FIG. 7 illustrates a data flow diagram of an overview of a money transfer process 700, between a sender 701 and a recipient 702, by use of a payment proxy within a landing page, in accordance with some embodiments of the disclosed technology. The process 700 involves communication between a landing page 704 that is associated with the PSS 110 and the PSS 110 of FIG. 1. The landing page 704 can be executed by the one or more servers 112 (e.g., a web server) of the payments service system 110. The landing page 704 can be generated by the PSS 110 to receive, or collect, one or more payments on behalf of the recipient 702 from one or more senders (e.g., 701A, 701B, 701C, etc.). As illustrated in FIG. 7, the landing page 704 is embodied as a website whose URL can be personalized based on a payment proxy associated with the recipient 702. In particular, the landing page 704 can be generated by canonicalizing the URL to a unique representation that includes at least a portion of the payment proxy to personalize the landing page 704 for the recipient 702. For example, a personalized landing page can have a URL that includes, for example, a monetary indicator preceding multiple alphabetic characters (e.g., www . . . com/$redcross). In some embodiments, the URL can be different from the payment proxy, yet still be canonicalized for ease of use in transferring money to the recipient 702 via the landing page 704.

The sender 701 can visit the landing page 704 to send money to the recipient 702. Note that while the process 700 is described for a particular sender 701 sending money to the recipient 702, in other embodiments, the process 700 can be executed for multiple senders (e.g., 701A, 701B, 701C), where each sender can send money to the recipient 702 by visiting the landing page 704 and submitting individual payment amounts. In such embodiments, the individual payment amounts from the multiple senders can be aggregated into an accumulated payment amount that gets transferred, by the PSS 110, to the recipient 702.

The process 700 starts with the sender 701 accessing the landing page 704, e.g., by entering a URL into a web browsing application installed on a sender device of the sender 701 (e.g., the client device 102C of FIG. 1). In some embodiments, the sender 701 can access the landing page 704 by navigating from another webpage associated with the PSS 110 (e.g., a user profile page). In such embodiments, the sender 701 has logged into, e.g., the user profile page, which enables the PSS 110 to know the identity of the sender 701. The identity information can include, for example, a sender identifier, such as an email address, of the sender 701. The PSS 110 can utilized the sender identifier in executing some operations of the process 700, as will be discussed further below.

Upon arriving at the landing page 704, the sender 701 can simply enter a payment amount, e.g., in an input field displayed at the landing page 704, and send the money, e.g., by engaging with a "PAY!" action button displayed at the landing page 704. At block 710, the landing page 704, in response, sends the user request (i.e., request to pay the recipient 702) to the PSS 110, e.g., via the API 114. In some embodiments, at block 712, the PSS 110 responds with data for displaying a message 706 to the sender 701 at the landing page 704. In some embodiments, the message 706 prompts the sender 701 to enter a unique identifier associated with the sender 701 to confirm the money transfer to the recipient 702.

Upon receiving the unique identifier, the landing page 704 forwards the identifier to the PSS 110, which utilizes the identifier to determine a financial account associated with the identifier ("sender financial account"). In some embodiments, the PSS 110 determines the sender financial account based on a stored association between the sender financial account and the identifier, where that sender financial account has been registered with the PSS 110 in a previous transaction.

In some embodiments, the PSS 110 proceeds to identify the sender financial account without prompting (e.g., via the message 706) the identifier from the sender 701. In such embodiments, the PSS 110 can identify the identifier based on the navigation of the sender 701 to the landing page 704 from a page associated with the PSS 110 (e.g., a user profile page at another website or a payment service application). That is, based on the login credentials submitted at the page associated with the PSS 110, the PSS 110 is able to retrieve the identifier associated with the sender 701 to determine the sender financial account, without need for prompting the identifier from the sender 701.

Note that the sender 701 may not already have an account with the PSS 110, but would still be able to transfer money to the recipient 702 by navigating to the landing page 704 associated with the recipient 702. In such scenario where the sender 701 is not yet known to the PSS 110, the PSS 110 can determine the sender 701 based on the sender identifier. For example, the PSS 110 obtains the identifier via the confirmation message 706, as discussed with respect to block 712. In another example, the PSS 110 obtains the sender identifier based on login credentials associated with the payment service application provided by the PSS 110.

In some embodiments, the PSS 110 also determines a financial account associated with the recipient ("recipient financial account"). In some embodiments, the PSS 110 identifies the recipient financial account based on an association of the recipient financial account with the payment proxy included in the URL of the landing page 704. In some embodiments, the PSS 110 identifies the recipient financial account based on an association of the recipient financial account with the landing page 704.

In addition to identifying the sender financial account and the recipient financial account, the PSS 110 also determines a payment amount that the sender 701 desires to send to the recipient 702. The PSS 110 can determine the amount by analyzing the input that the sender 701 enters at the landing page 704. In some embodiments, the PSS 110 determines one or more financial accounts associated with additional senders (e.g., 701B and 701C) that submit a payment amount at the landing page 704 for the recipient 702. In such embodiments, the PSS 110 aggregates the individual payment amounts to generate an aggregated payment amount. In some embodiments, as briefly discussed above, the aggregated payment amount may be distributed to multiple financial accounts associated with the payment proxy. For example, the total amount received from donations from five family members can be distributed to a summer camp fund (e.g., $summerSmithKids) and a back-to-school supplies fund (e.g., $b2school).

At block 714A, the PSS 110, having identified the sender financial account, the recipient financial account, and the payment amount (or aggregated payment amount), initiates a transfer of the payment amount from the sender financial account to the recipient financial account. Initiating the money transfer can include, for example, at block 714B, the PSS 110 communicating a request to a card issuer of the user sender 701 (or each card issuer of the senders 701A, 701B, 701C) to transfer the money. In another example, the PSS 110 processes a card 708 of sender 701, e.g., a credit card or a debit card, holds the payment amount on behalf of the recipient 702, and can forward the payment amount to the recipient 702 once a financial account has been linked with the PSS 110. Note this set of operations can be performed for each card associated with each of the senders (e.g., 701A, 701B, 701C). Alternatively, the PSS 110 can generate a transaction using ACH that debits an amount from a bank account of the sender 701 and can credit the amount into a bank account of the recipient 702, e.g., using ACH, or onto a debit account, e.g., over debit rails, of the recipient 702.

Note this set of operations can also be done for each bank account of each senders (e.g., 701A, 701B, 701C).

In some embodiments, the PSS 110 sends a confirmation message to a user to obtain a confirmation before causing the money to be transferred, even if the financial account of the user has already been identified. In such embodiments, the confirmation message operates as a safety measure to ensure that it is the user that wishes to participate in the money transfer. This can be beneficial, for example, for the sender 701 who may have inadvertently triggered the money transfer, may have entered the incorrect payment proxy (e.g., $redcross versus $red4cross), and/or may have changed his/her mind and wishes to cancel the money transfer. On the other hand, the recipient 702 may also benefit from receiving a confirmation message, for example, to verify who has sent money and/or to decline the money from the sender 701.

Figure 8:
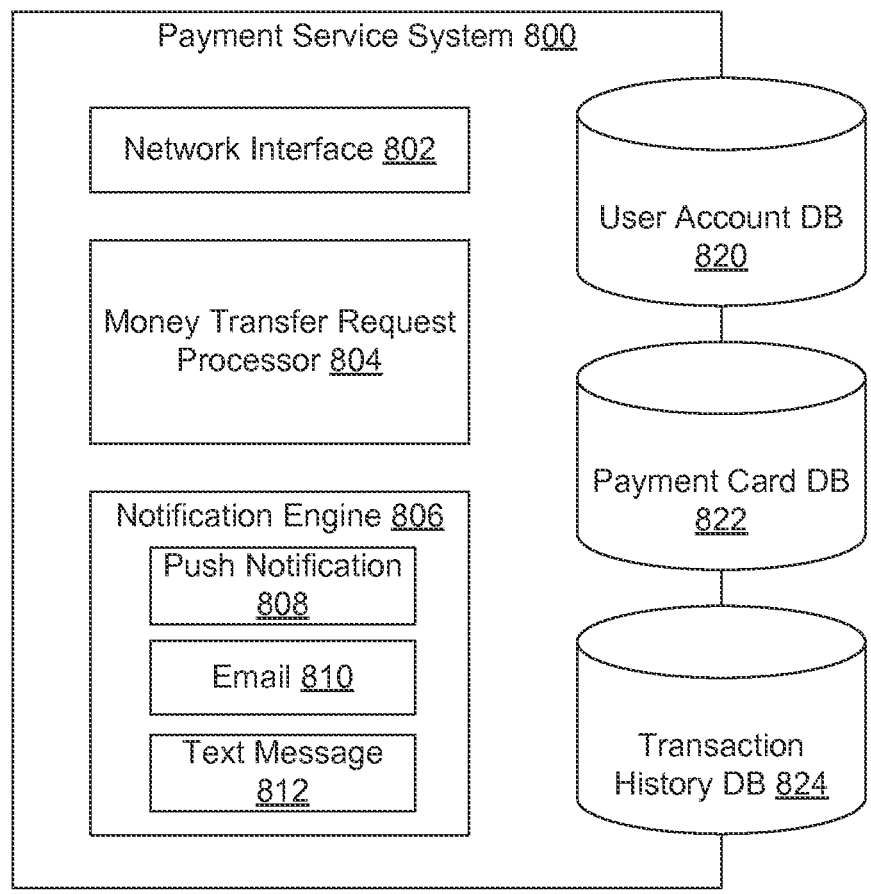
FIG. 8 is a block diagram illustrating various components of a payment service system executing the cash tagging technology, in accordance with some embodiments.

FIG. 8 is a block diagram illustrating various components of a payment service system 800 ("PSS 800") executing the cash tagging technology, in accordance with some embodiments. In some embodiments, the PSS 800 can be the PSS 110 of FIG. 1. The PSS 800 includes a network interface 802, a money transfer request processor 804, and a notification engine 806 ("request engine 806"). In some embodiments, the PSS 800 further includes one or more databases, such as a user account database 820 ("DB 820"), a payment card database 822 ("DB 822"), and a transaction history database 824 ("DB 824").

The network interface 802 can be a networking module that enables the PSS 800 to transmit and/or receive data in a network with an entity that is external to the PSS 800 (e.g., a remote server associated with a communication application), through any known and/or convenient communications protocol supported by the PSS 800 and the external entity. The network interface 802 can include one or more of a network adaptor card, a wireless network interface card (e.g., SMS interface, WiFi interface, interfaces for various generations of mobile communication standards including, but not limited to, 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

Each of the DBs 820, 822, and 824 can include, for example, one or more hard drives (which may be further coupled together using RAID-0, 1, 5, 10, etc.), a centralized or distributed data cluster, a cloud-storage service provider, or other suitable storage systems suitable for storing digital data. The DB 822 can store various fields of data, such as user identifiers (IDs) (e.g., email addresses, telephone numbers, usernames, unique IDs associated with the cash tagging technology ("unique cash ID") (e.g., $alex), device IDs, etc.), user profile information, shipping address, billing address, and/or the like. The DB 822 can store various fields of data, such as user identifiers associated with payment cards, payment card/account numbers, expiration dates, card/account type, CVVs, billing addresses, and/or the like. The DB 824 can store various fields of data, such as transaction identifiers (IDs), user identifiers (IDs), transaction dates/times, amounts, transaction participant identification information (e.g., email addresses or telephone numbers associated with the senders and recipients of money transfer transactions), and/or the like.

The PSS 800 can access the databases 820, 822, and 824 to retrieve and/or store data for executing the cash tagging technology. In particular, the PSS 800 can search the databases 820, 822, 824 for data stored in association with other relevant data needed to process money transfers associated with the cash tagging technology. For example, the PSS 800 can store, in any of the databases 820, 822, and/or 824, a newly created unique cash ID of a user (e.g., sender user or recipient user) in association with another identifier associated with the user (e.g., telephone number, email address, instant message username, etc.). In this example, the PSS 800 can create the unique cash ID in response to, for example, the user registering for a money transfer service via the tagging mechanism, which is provided by the PSS 800. The registration can include, for example, the user submitting payment card information for the PSS 800 to process the money transfer service. In another example, the PSS 800 can search and retrieve, from the databases 820, 822, and/or 824, a user's email address that is stored in association with the user's unique cash ID. In some embodiments, the data stored in the DBs 820, 822, and 824 can be utilized for determining intent of a sender to transfer money. For example, data about past transactions can help the PSS 800 determine the context of a message composed by a sender, and utilize such context to predict the intent to transfer money.

The money transfer request processor 804 ("processor 804") can process money transfer requests associated with the cash tagging technology as described in detail throughout the specification, for example, at least with respect to FIGS. 1-5. For example, the processor 804 can receive a money transfer request from a communication application (and/or a server computer system associated with the communication application), parse the money transfer request to extract details such as identification information that identifies a money sender (e.g., telephone number), identification information that identifies a money recipient (e.g., a unique cash ID), the amount, and the like. The processor 804 can check, based on the identification information associated with the money sender and the money recipient, respectively, whether the respective identification information are associated with one or more payment cards of the money sender and recipient, respectively. For example, the processor 804 accesses the DBs 820, 822, and/or 824 to determine whether the money sender's telephone number is associated with payment card data that identifies the money sender's payment card. In another example, the processor 804 accesses the DBs 820, 822, and/or 824 to determine whether the unique cash ID of the money recipient is associated with payment card data that identifies the money recipient's payment card. The processor 804 can then initiate a transfer of an amount associated with the money transfer request from, e.g., a bank account funding the money sender's payment card to a bank account associated with the money recipient's payment card.

In some embodiments, users (e.g., the money sender and the money recipient) can have mobile applications installed on their mobile devices. In such embodiments, the money transfer requests associated with those users can cause the notification engine 806 to generate and send push notifications using a push notification module 806. In some embodiments, a push notification for a money transfer request may be generated based on information included in the money transfer request, and can prompt the user to confirm or cancel the money transfer request. For example, a push notification can be a message that prompts a sender user to confirm she wants to send money to a recipient (i.e., confirm her intent to send money when she has submitted an input with a specified syntax). In some embodiments, the push notification can prompt the user to provide payment card information associated with a payment card of the user to process the money transfer request. Based on the user's response, the PSS 800 can process the money transfer request by initiating transfer of an amount of funds corresponding to the money transfer request.

In some embodiments, the notification engine 806 can include an email notification module 810 to generate and send email notifications. In such embodiments, the notification engine 806 is able to communicate with users who may not have the mobile application installed on their mobile devices and/or may not have mobile devices. An email notification generated by the email notification module 810 can be in the form of an electronic mail, or email message, that prompts a user to confirm or cancel a money transfer request. In some embodiments, the email message can prompt the user to provide payment card information associated with a payment card of the user to process the money transfer request.

In some embodiments, the notification engine 806 can include a text notification module 812 to generate and send text message notifications. In such embodiments, the notification engine 806 is able to communicate with users who may not have the mobile application installed on their mobile devices. A text message notification generated by the text notification module 812 can be in the form of a text message that prompts a user (e.g., a money sender user) to confirm or cancel a money transfer request. In some embodiments, the text message can prompt the user to provide payment card information associated with a payment card of the user to process the money transfer request.

Note the notification engine 806 and its associated modules can be utilized to communicate with recipient users, in addition to sender users. For example, the email notification module 810 can generate an email message to obtain payment card information from a recipient user. In another example, the push notification module 808 can generate a push notification to obtain payment card information from the recipient user. In yet another example, the text notification module 812 can generate a text message to obtain payment card information from the recipient user.

FIG. 9 illustrates example database tables coupled to the payment service system 110 in accordance with some embodiments of the cash tag technology. In some embodiments, the PSS 110 can utilize the data stored in the databases 902, 904, and/or 906 to process payment transactions (e.g., money transfers) on behalf of customer users of the payment service employing the PSS 110. For example, the PSS 110 can utilize the data in the database tables 902, 904, 906 as an index of all customer users who have user accounts and/or payment proxies registered with the PSS 110.

As illustrated, FIG. 9 illustrates example fields of a database table 902, a database table 904, and a database table 906. The database table 902 can include various fields of information such as, but are not limited to, customer ID1 (e.g., payment proxy), customer ID2 (e.g., email address), customer ID3 (e.g., phone number), first name, last name, billing address, and/or the like. The database table 904 can include various fields of information such as, but not limited to, customer ID1, card identifier (e.g., card account number), issuer, expiration date, billing address, and/or the like. In some embodiments, the customer ID1 can be replaced with other customer identifiers, or IDs, associated with the same customer, e.g., customer ID2 or customer ID3. The database table 906 can include various fields of information such as, but not limited to, transaction date, transaction ID, customer ID1 (e.g., a customer such as a recipient user), cusomter2 ID1 (e.g., a customer such as a sender user), a transaction amount (e.g., money transfer payment amount), and/or the like.

FIG. 10A-10B illustrate various examples of graphical user interfaces for emails received by recipients of money transfers, in accordance with various embodiments of the cash tag technology.

FIG. 10A is an illustration of an example user interface 1000 of an email message sent from a PSS (e.g., the PSS 110 of FIG. 1). The email message can be sent from a payment service email address 1002 associated with the PSS to a sender email address 1004. The sender email address 1004 is associated with an identifier (e.g., a user account registered with the PSS 110). In some embodiments, the sender email address 1004 is provided as the identifier of the sender to the PSS 110. The subject 1006 can include a description of the recipient (i.e., as identified by the payment proxy) and a sent payment amount. The description 1008 of the email can include a link to a resource, e.g., a customized link in the confirmation email described above in reference to various embodiments, for the sender to link a payment card for processing the transfer of the payment amount.

FIG. 10B is an illustration of an example user interface 1010 of an email message sent from a PSS (e.g., the PSS 110 of FIG. 1). The email message can be sent from a payment service email address 1012 associated with the PSS to a recipient email address 1014. The recipient email address 1014 is associated with a payment proxy (e.g., $funnyguy311) included in a message of a sender to trigger a money transfer to the recipient. The subject 1016 can include a payment amount sent from the sender. The description 1018 in a body of the email can include a link to a resource, e.g., a customized link in the confirmation email described above in reference to various embodiments, for the recipient to redeem the payment amount.

Figure 12:
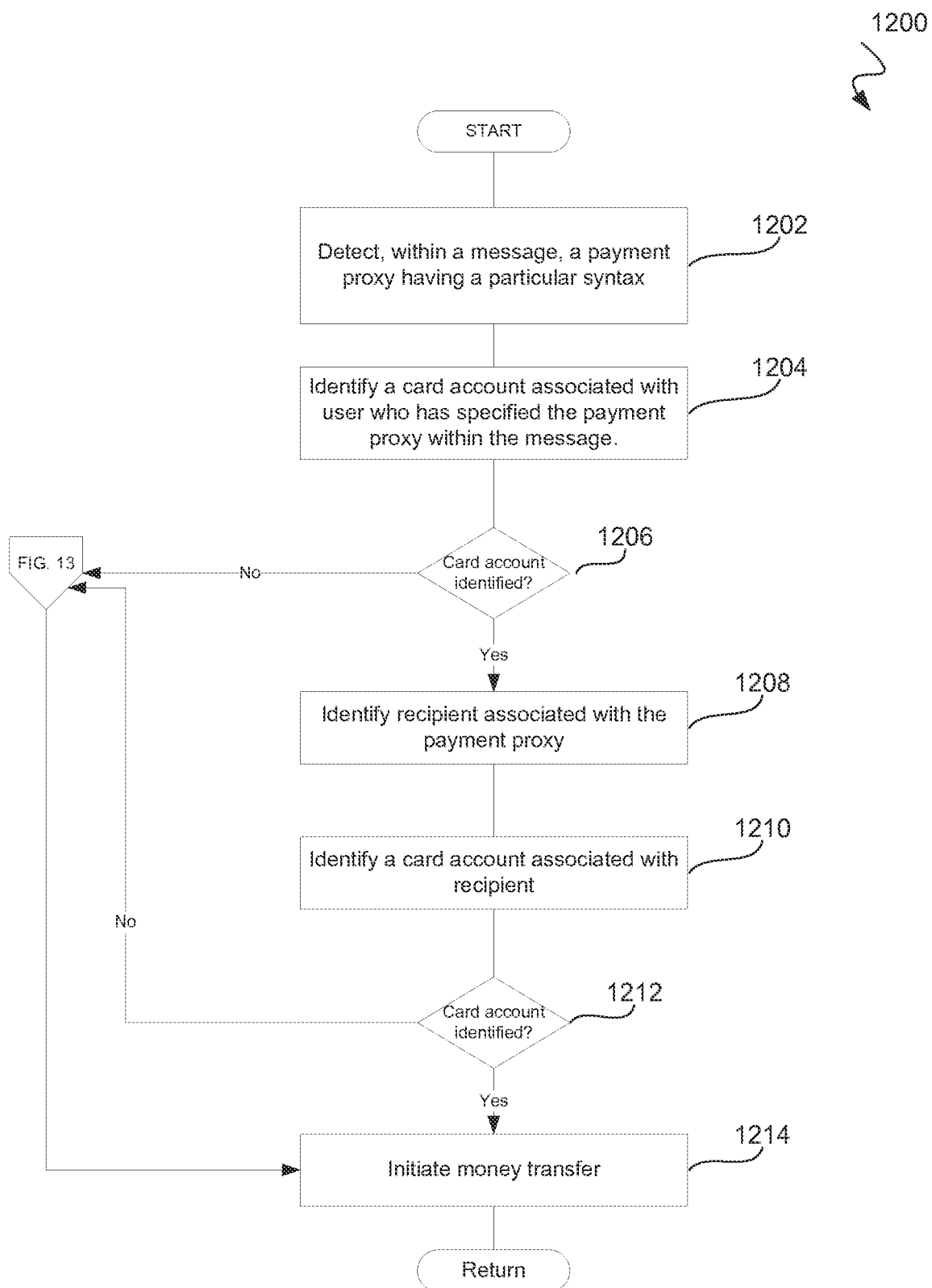
FIG. 12 is a flowchart illustrating an example process 1200 of transferring money (or cash payment) by use of a payment proxy.

FIG. 12 is a flowchart illustrating an example process 1200 of transferring money (or cash payment) by use of a payment proxy, according to an embodiment of the present subject matter. The process 1200 can be performed by one or more components, devices, or modules such as, but not limited to, the client devices 102, the Web server 104, the application server 106, the PSS 110, or other component or device. As illustrated in FIG. 12, the process 600 includes a set of operations from block 1202 to block 1214.

The process 1200 starts with the operation at block 1202, which detects a message that includes a payment proxy having a particular syntax, the syntax being a monetary indicator preceding one or more alphanumeric characters. Performing detection can include monitoring messages at predetermined intervals and detecting any message having the syntax. The predetermined intervals can be configured by an administrator of the system (e.g., continuously, every 5 minutes, every hour, etc.) The message can be created by a user at a computer system associated with a content provider. For example, the user posts at a social networking website a message "Great performance, $funnyguy, here is $10!", where that message includes the payment proxy "$funnyguy. In another example, the user sends, within an instant messaging application, a chat message "Great performance the other day! Here is 10 dollars.", where that instant message is addressed to a payment proxy "$funnyguy" (e.g., in the TO field of the instant message). The system can perform a database lookup to interpret the message. The database can store tables that map an amount to known templates. For example, "dollar," "bill," or "bucks" is mapped to currency and numeric character associated with that currency is the actual amount.

The operation at block 1204 identifies a card account associated with the user who has specified the payment proxy, e.g., $funnyguy, in the message. The operation at block 1204 can include accessing a database to determine a stored association between an identifier associated with the user and the payment proxy, where that stored association has been established in another transaction conducted by the sender with a service provider providing financial services, such as a payment transaction, e.g., the PSS 110.

The operation at block 1206 determines whether the card account associated with the user has been identified. This may happen in case the card account is unavailable or the user declines money transfer links between accounts. If no card account is identified, the process 1200 proceeds to the process 600 of FIG. 6. If a card account is identified for the user, the process 1200 proceeds to the operation at block 1208. The operation at block 1208 identifies a recipient associated with the payment proxy detected at block 1202. This can be carried out, for example, by accessing a database that stores user account information to identify a stored association between the payment proxy and a user account of a recipient. The stored association can be established in another transaction in which the payment proxy is registered with the PSS 110. The operation at block 1210 identifies a card account that is associated with the recipient identified at block 1208 based on an association between the user account of the recipient and the card account.

The operation at block 1212 determines whether the card account has been identified. If no card account associated with the recipient is identified, the process 1200 proceeds to the process 600 of FIG. 6. If a card account associated with the recipient is identified, the process 1200 proceeds to block 1214, at which the money transfer is initiated. In some embodiments, the operation at block 1214 includes identifying a payment amount for the money transfer based on a parsing of the message created by the user. In some embodiments, the operation at block 1214 also includes generating a confirmation message. The confirmation message can be sent to the user and/or the recipient associated with the payment proxy to confirm the money transfer. Upon confirmation received, the money, e.g., a payment amount, is caused to be transferred to the financial account associated with the recipient.

Figure 13:
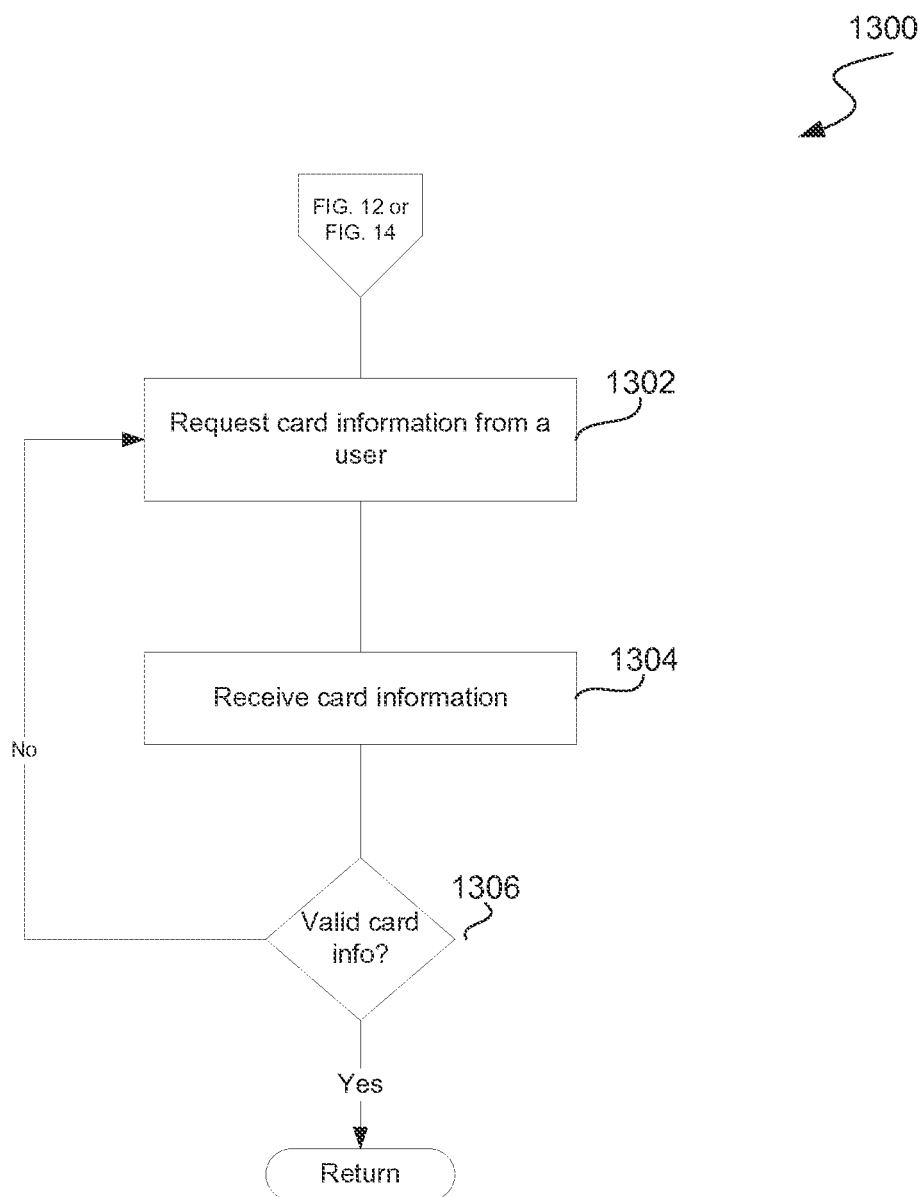
FIG. 13 is a flowchart illustrating an example process 1300 of linking a card account for a transfer of money by use of a payment proxy.

FIG. 13 is a flowchart illustrating an example process 1300 of linking a card account for a transfer of money by use of a payment proxy. The process 1300 can be performed by one or more components, devices, or modules such as, but are not limited to, the client devices 102, the Web server 104, the application server 106, the PSS 110, or other component or device. As illustrated in FIG. 13, the process 1300 includes a set of operations from block 1302 to block 1306. In some embodiments, the process 1300 can be implemented as part of the process 1200 of FIG. 12. In some embodiments, the process 1300 can be implemented as part of the process 700 of FIG. 7.

The operation at block 1302 generates a message that requests, from a user, financial account information, such as payment card information associated with a payment card, e.g., a debit card or a credit card. The message can be, for example, a financial account request message. The message can be generated for display to a user by the client device 102 of the user based on, e.g., instructions received from the PSS 110. In some embodiments, the message can be in the form of an email message. In some embodiments, the message can be in the form of a text message. In some embodiments, the message can be in the form of a push notification.

The message can include a link that is configured to request the financial account information from a sender of a money transfer triggered by use of the payment proxy. An example of such a message is shown in FIG. 10A. The message can include a link that is configured to request the financial account information from a recipient of a money transfer triggered by use of the payment proxy. An example of such a message is shown in FIG. 10B.

The operation at block 1304 receives the financial account information, e.g., debit card account information, from the user. The financial account information can be received, for example, from the client device 102 of the sender (e.g., sender device) or of the recipient (e.g., recipient device). The operation at block 1306 verifies the authenticity of the financial account information received, e.g., valid expiration date, valid card number, valid account holder name, etc. In some embodiments, if the financial account information is not valid, the process 1300 requests the financial account information again from the user. For example, a second financial account request message is sent to the user's email address. In another example, the second financial account request message is sent using a different identifier of the user, e.g., a telephone number, e.g., in case the stored email address is incorrect. The process 1300 returns if valid financial account information is submitted. In some embodiments, the financial account information is stored in association with the user for future uses, e.g., for processing payment transactions, such as money transfers.

Figure 14:
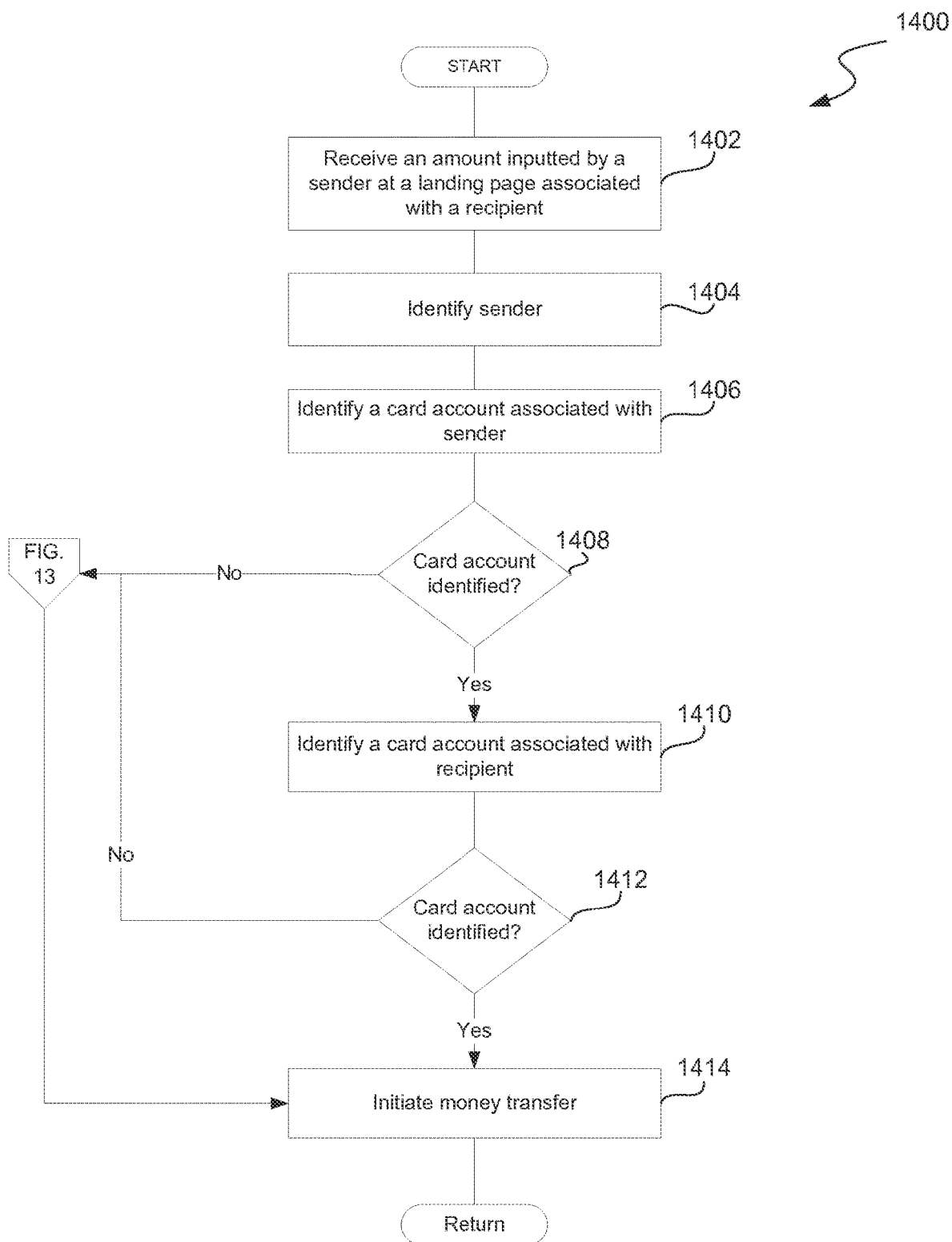
FIG. 14 is a flowchart illustrating an example process 1400 of transferring money within a landing page context.

FIG. 14 is a flowchart illustrating an example process 1400 of transferring money within a landing page context. The process 1400 can be performed by one or more components, devices, or modules such as, but not limited to, the client devices 102, the Web server 104, the application server 106, the PSS 110, or other component or device. As illustrated in FIG. 14, the process 1400 includes a set of operations from block 1402 to block 1414.

The process 1400 starts with the operation at block 1402, which receives a payment amount inputted by a sender user at a landing page associated with a recipient. The operation at block 1404 identifies the sender user who has submitted the payment amount. In some embodiments, the operation at block 1404 includes generating a message to prompt the sender user to submit an identifier associated with the sender user, such as an email address, where the submitted identifier helps to identify the sender user. In some embodiments, the operation at block 1404 includes analyzing any data associated with the sender user, e.g., login credentials from a previous navigation page that has redirected the sender user to the landing page. Using the login credentials, the identity of the sender user can be determined. For example, a previous page visited by the sender is identified to derive the login credentials. The previous page can be, for example, a website associated with the PSS 110. In another example, the previous page can be a payment service application associated with the PSS 110. In yet another example, the previous page can be a microblogging website associated with the Web server 104.

The operation at block 1406 identifies a financial account, e.g., a debit card account, that is associated with the sender based on the identifier determined at block 1404. The financial account can be determined based on a stored association between the identifier and the financial account, where the stored association is established in a previous transaction (e.g., account registration or a past money transfer). The operation at block 1408 determines if the financial account is identified. If no account associated with the sender is identified, the process 1400 proceeds to the process 600 of FIG. 6. If an account is identified, the process 1400 proceeds to block 1410.

The operation at block 1410 identifies a financial account, e.g., a debit card account, that is associated with the recipient associated with the landing page. The financial account associated with the recipient can be determined based on a stored association between the landing page and the financial account, where the stored association is established in a previous transaction (e.g., registration of the landing page or a past money transfer). The operation at block 1412 determines if the financial account associated with the recipient is identified. If no account associated with the recipient is identified, the process 1400 proceeds to the process 600 of FIG. 6. If an account is identified, the process 1400 proceeds to block 1414.

The operation at block 1414 initiates a transfer of the payment amount from the financial account associated with the sender to the financial account associated with the recipient. In some embodiments, the operation at block 1414 includes identifying a payment amount for the money transfer based on the input received via the landing page (e.g., the input received at block 1402). In some embodiments, the operation at block 1414 also includes generating a confirmation message to a user, such as the sender or the recipient. Upon confirmation received, the money is caused to be transferred to the financial account associated with the recipient. In some embodiments, the confirmation message is sent to the sender by using the sender identifier (e.g., email address). In some embodiments, the confirmation message is sent to the recipient by using an identifier associated with the landing page (e.g., email address), or an identifier associated with the payment proxy.

Figure 15:
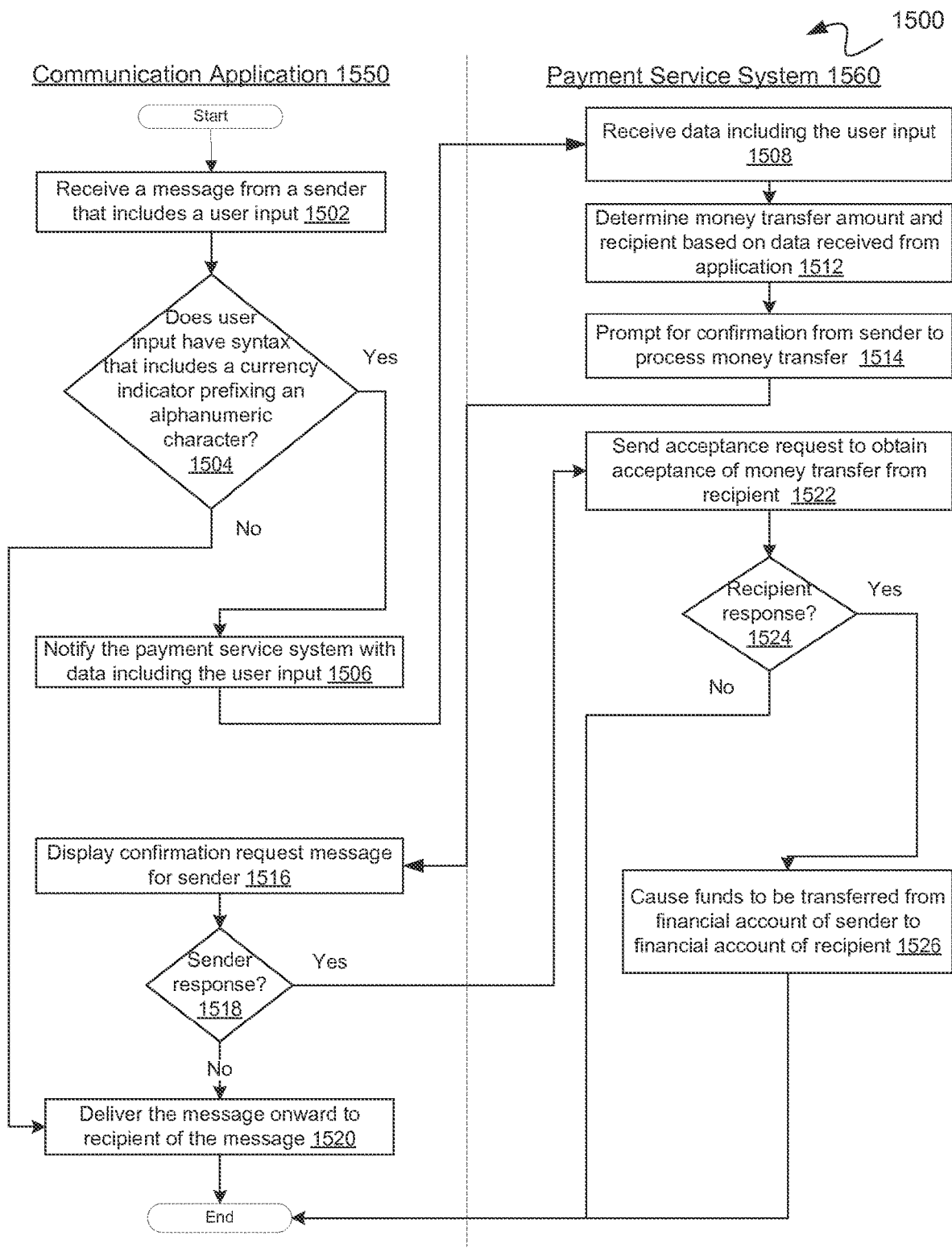
FIG. 15 is a flow diagram illustrating an example method 1500 of executing the cash tagging technology.

FIG. 15 is a flow diagram illustrating an example method 1500 of executing the cash tagging technology, in accordance with some embodiments. In some embodiments, the method 1500 is carried out by a communication application 1550 (e.g., a messaging application) working in coordination with the PSS 1560. In some embodiments, a server computer system associated with the communication application 1550 can perform the method 1500 in coordination with the PSS 1560. In some embodiments, the communication application 1550 is executing on a client device 102 of the sender 140. In some embodiments, the PSS 1560 can be the PSS 110 of FIG. 1.

At block 1502, the communication application 1550 receives a message inputted by the sender, e.g., sender 140, where the message includes one or more user inputs. At decision block 1504, the communication application 1550 determines (e.g., parsing) whether any of the user inputs in the message triggers a tagging mechanism in the form of a currency indicator (e.g., $). Based on the detection of the currency indicator, the application 1550 can determine the user's intent, or indication, to transfer money, and can execute, or trigger execution, of such money transfer, without requiring an explicit command from the user to transfer the money. The communication application 1550 further identifies whether that user input is of the type with the syntax of the monetary indicator prefixing one or more numeric characters (e.g., 1, 5, 20, 100, etc.), which may be stored or used in block 1512. If the message includes a user input that contains the currency indicator prefixing an alphabetic or a numeric character ("Yes" branch), the communication application 1550 can trigger execution of the money transfer by transmitting a message to notify the PSS 560, as indicated in block 1506. If there is not a user input in the message that contains the specified syntax (i.e., currency indicator prefixing one or more alphanumeric characters), the communication application 1550 continues with its communication functionality by transmitting, or delivering, the message to the recipient of the message, as indicated in block 1520.

At block 1508, the PSS 560 receives the message from the communication application 1550, and parses the message for identification information of the sender 140 and the recipient 102 and the amount to be transferred in the money transfer request. At block 1512, the PSS 560 identifies the money transfer amount and the recipient 102 based on the parsed information. For example, the PSS 560 identifies the amount based on the second user input of "$5." In another example, the second user input may be set to a default value. In another example, the PSS 560 identifies the recipient 102 based on the user input of "$alex."

At block 1514, the PSS 560 causes a message to be sent to the sender 140 to prompt for a confirmation that the sender 140 wishes to transfer the money. For example, the PSS 560 sends a message to the communication application 1550 to cause it to display a message to prompt the sender for the confirmation, as indicated in block 1516. Block 1514 is executed to ensure, for example, the intention of the sender 140 to send money when the sender 140 submits the input of "$5" in the message received by the communication application 1550.

At decision block 1518, the communication application 1550 determines whether the sender 140 has responded with a confirmation. If the sender 140 does not confirm and/or sends a confirmation (e.g., selects "No" or "Cancel" to cancel the money transfer request), the process 1500 proceeds to block 1520. At block 1520, the communication application 1550 can deliver the message onward to the recipient as an ordinary message (i.e., no money transfer is involved). In some embodiments, when the sender does not confirm, the message does not get delivered. That is, upon determination that there is no intent from then sender to transfer money and/or a determination that the sender would like to cancel the money transfer, the message does not get sent. The process 1500, in such embodiments, would end. If the sender 140 does confirm (e.g., selects "Yes" or "Send cash"), the process 1500 proceeds to block 1522.

At block 1522, the PSS 560 sends a message to request acceptance of the money transfer request from the recipient 102. The PSS 560 can use the identification information associated with the recipient 102 that has been received in the message at block 1508 to deliver the acceptance request message. For example, the identification information associated with the recipient 102 includes a telephone number, which can be used by the PSS 560 to send a text message to obtain the acceptance from the recipient 102. In another example, the identification information associated with the recipient 102 includes an email address, which can be used by the PSS 560 to send a text message to obtain the acceptance from the recipient 102.

In yet another example, the identification information associated with the recipient 102 includes a unique cash ID. In this example, the PSS 560 can perform a database lookup to identify information associated with the unique cash ID, where that information can be used to reach out to the recipient 102. For example, that information can include an instant messaging username of the recipient. In this example, the PSS 560 can use the username as a reference that gets included in a request message to a server computer system associated with the communication application 1550, where the request message prompts the server computer system to generate and send the acceptance request message to the recipient 102 on behalf of the PSS 560. The acceptance request message can include, for example, a link that redirects to a landing page facilitated by the PSS 560.

At block 1524, the PSS 560 determines whether the recipient 102 has submitted a response to accept the money transfer amount included in the sender's money transfer request. If the PSS 560 receives an acceptance, the process 1500 proceeds to block 1526, at which the PSS 560 causes funds to be transferred from the financial account of the sender 140 to the financial account of the recipient 102. If the PSS 560 does not receive an acceptance, the process 1500 ends. In some embodiments, when the sender does not respond and/or cancels the request, a notification may be transmitted back to the sender 140. That is, upon determination that there is no intent from the recipient to accept transfer of money and/or a determination that then recipient would like to cancel the money transfer, a notification message is transmitted to the sender, and the process 1500 would end.

In some embodiments, the recipient 142 may request for a money transfer from the sender 140. In such embodiments, the recipient 142 may utilize the communication application 1550 for execution of a similar process 1500 that is carried out on behalf of the sender 140. For example, in such embodiments, the recipient 142 can utilize a client device to launch the communication application 1550 and compose a message to the sender 140 via the application 1550. Instead of a message indicating intent to transfer money, the message from the recipient 142 can indicate an intent to request money (e.g., "Please transfer me $20 for lunch."). The communication application 1550 can parse the message and detect the syntax of the input "$20" to determine a (reverse) money transfer is requested by the recipient 142. The communication application 1550 can notify the PSS 1560 (e.g., by establishing communication links with either a payment application and/or a messaging server in communication with the PSS 1560). The PSS 1560 can proceed by confirming with the recipient 142 of such intent to request money from the sender 140. Upon confirmation by the recipient and the sender, the PSS 1560 can initiate the transfer (e.g., cause funds to be transferred from a financial account of the sender to the recipient).

Regarding the processes 200, 300, 400, 500, 700, 1200, 1300, 1400, and 1500, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

Figure 16:
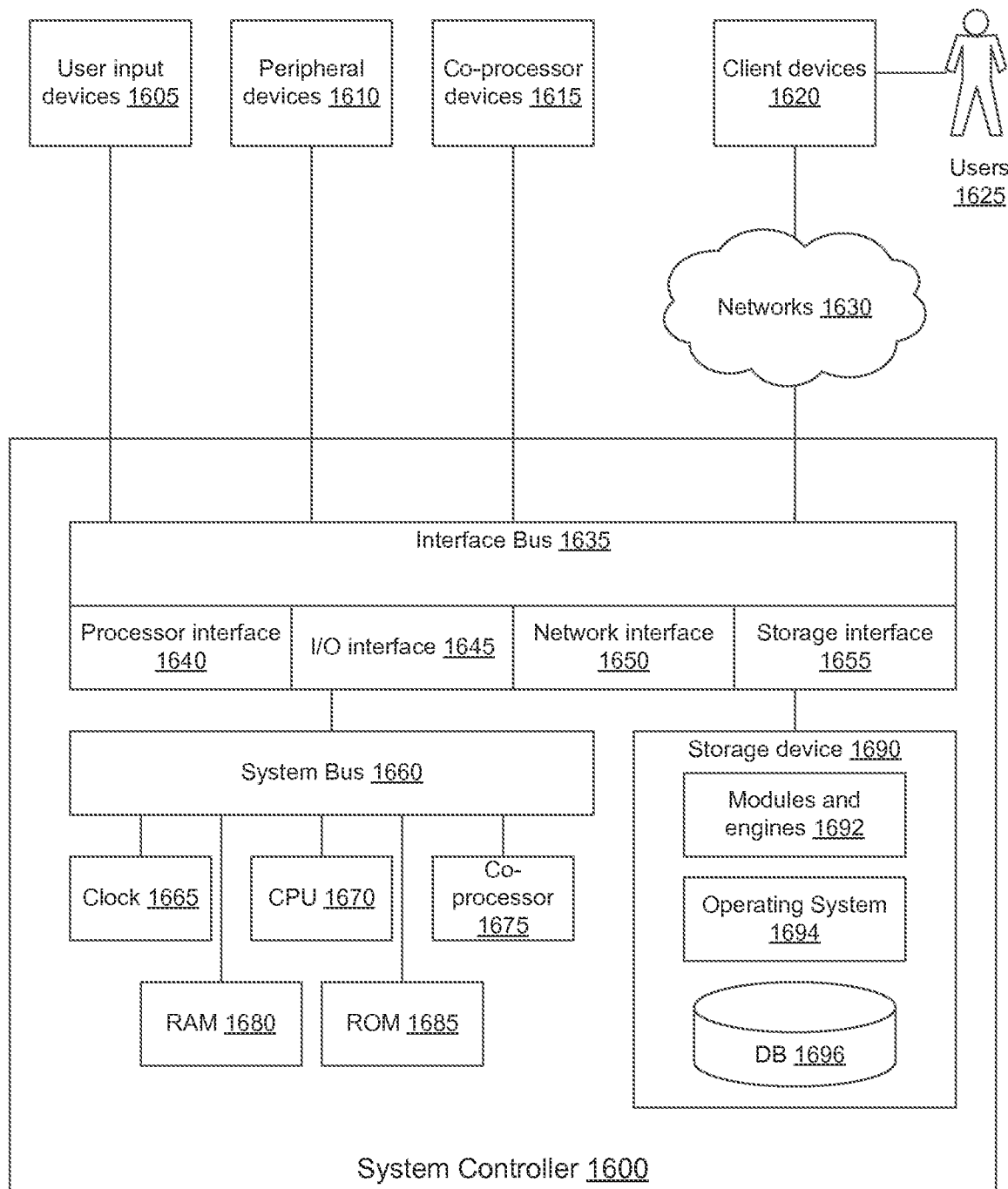
FIG. 16 illustrates an example of a processing system controller 1600 with which some embodiments of the payment proxy technology can be utilized.

FIG. 16 illustrates an example of a processing system controller 1600 with which some embodiments of the payment proxy technology can be utilized. In some embodiments, the processing system controller 1600 can be the PSS 110 described in FIG. 1.

The system controller 1600 may be in communication with entities including one or more users 1625, client/terminal devices 1620 (e.g., devices 102), user input devices

1605, peripheral devices 1610, an optional co-processor device(s) (e.g., cryptographic processor devices) 1615, and networks 1630. Users 1625 may engage with the controller 1600 via terminal devices 1620 over networks 1630.

Computers may employ central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1600 may include clock 1665, CPU 1670, memory such as read only memory (ROM) 1685 and random access memory (RAM) 1680 and co-processor 1675 among others. These controller components may be connected to a system bus 1660, and through the system bus 1660 to an interface bus 1635. Further, user input devices 1605, peripheral devices 1610, co-processor devices 1615, and the like, may be connected through the interface bus 1635 to the system bus 1660. The interface bus 1635 may be connected to a number of interface adapters such as processor interface 1640, input output interfaces (I/O) 1645, network interfaces 1650, storage interfaces 1655, and the like.

Processor interface 1640 may facilitate communication between co-processor devices 1615 and co-processor 1675. In one implementation, processor interface 1640 may expedite encryption and decryption of requests or data. Input output interfaces (I/O) 1645 facilitate communication between user input devices 1605, peripheral devices 1610, co-processor devices 1615, and/or the like and components of the controller 1600 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1650 may be in communication with the network 1630. Through the network 1630, the controller 1600 may be accessible to remote terminal devices 1620 (e.g., client devices 102). Network interfaces 850 may use various wired and wireless connection protocols such as, direct connect, Ethernet, wireless connection such as IEEE 802.11a-x, and the like.

Examples of network 1630 include the Internet, Local Area Network (LAN), Metropolitan Area Network (MAN), a Wide Area Network (WAN), wireless network (e.g., using Wireless Application Protocol (WAP), a secured custom connection, and the like. The network interfaces 1650 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1655 may be in communication with a number of storage devices such as, storage devices 1690, removable disc devices, and the like. The storage interfaces 1655 may use various connection protocols such as Serial Advanced Technology Attachment (SATA), IEEE 1394, Ethernet, Universal Serial Bus (USB), and the like.

User input devices 1605 and peripheral devices 1610 may be connected to I/O interface 1645 and potentially other interfaces, buses and/or components. User input devices 1605 may include card readers, fingerprint readers, joysticks, keyboards, microphones, mouse, remote controls, retina readers, touch screens, sensors, and/or the like. Peripheral devices 1610 may include antenna, audio devices (e.g., microphone, speakers, etc.), cameras, external processors, communication devices, radio frequency identifiers (RFIDs), scanners, printers, storage devices, transceivers, and/or the like. Co-processor devices 1615 may be connected to the controller 1600 through interface bus 1635, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1600 may employ various forms of memory including on-chip CPU memory (e.g., registers), RAM 1680, ROM 1685, and storage devices 1690. Storage devices 1690 may employ any number of tangible, non-transitory storage devices or systems such as fixed or removable magnetic disk drive, an optical drive, solid state memory devices and other processor-readable storage media. Computer-executable instructions stored in the memory may have one or more program modules such as routines, programs, objects, components, data structures, and so on that perform particular tasks or implement particular abstract data types. For example, the memory may contain operating system (OS) component 1692, modules and engines 1694, database tables 1696, and the like). The modules and engines 1694 can include, for example, a payment proxy module, a URL generation module, a mapping module, and/or a payment transfer module. These modules and engines 1692 may be stored and accessed from the storage devices, including from external storage devices accessible through an interface bus.

The database components can store programs executed by the processor to process the stored data. The database components may be implemented in the form of a database that is relational, scalable and secure. Examples of such a database include DB2, MySQL, Oracle, Sybase, and the like. Alternatively, the database may be implemented using various standard data-structures, such as an array, hash, list, struct, structured text file (e.g., XML), table, and/or the like. Such data-structures may be stored in memory and/or in structured files.

The controller 1600 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1600 may be distributed electronically over the Internet or over other networks (including wireless networks). Those skilled in the relevant art will recognize that portions of the system may reside on a server computer, while corresponding portions reside on a client computer. Data structures and transmission of data particular to aspects of the controller 1600 are also encompassed within the scope of the invention.

The above Detailed Description of embodiments of the disclosure is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features.

What is claimed:

1. A method for effectuating a financial transaction between first and second users of a payment service system, the method comprising:
   receiving, by the payment service system, from an application executing on a first mobile device of the first user, a request for a first payment proxy identifier for the first user;
   receiving, by the payment service system from an application executing on a second mobile device of the second user, a request for a second payment proxy identifier for the second user;
   generating, by the payment service system, the first and second payment proxy identifiers so that each of the first and second payment proxy identifiers (1) is for the respective first and second users, (2) has a currency indicator prefixing one or more alphanumeric characters, (3) is individually distinguishable from other payment proxy identifiers for other users, and (4) enables the payment service system to identify a financial account of a respective user in lieu of payment card mechanisms;
   associating, by the payment service system, the first payment proxy identifier with a first financial account of the first user and the second payment proxy identifier with a second financial account of the second user;
   receiving, by the payment service system, a message from the application executing on the first mobile device of the first user indicating a money transfer request from the first user for the second financial account to send funds to the first financial account, the message including the second payment proxy identifier in lieu of payment card mechanisms;
   in response to receiving the message by the payment service system, transmitting a text message to a mobile messaging application executing on the second mobile device of the second user, the text message including an indication of whether to confirm or cancel the money transfer request and including a hyperlink for the second user to select or interact with in order to approve payment; and
   based on a response from the second user, processing, by the payment service system, the money transfer request by initiating transfer of an amount of funds corresponding to the money transfer request from the second financial account to the first financial account.

2. The method of claim 1, wherein the text message transmitted to the mobile messaging application executing on the second mobile device of the second user includes an amount of the funds requested from the first user.

3. The method of claim 2, wherein the text message prompts the second user to confirm or cancel the money transfer request.

4. The method of claim 3, wherein the processing of the money transfer request is triggered when the second user confirms the money transfer request.

5. The method of claim 3, wherein the money transfer request is not processed when the second user cancels the money transfer request.

6. The method of claim 1, wherein the processing of the money transfer request includes parsing the message indicating the money transfer request.

7. The method of claim 1, wherein the currency indicator in each of the first and second payment proxy identifiers corresponds to a dollar sign.

8. The method of claim 7, wherein each of the first and second payment proxy identifiers consists of the dollar sign prefixing a set of one or more alphanumeric characters.

9. The method of claim 1, wherein at least one of the first user and the second user create an account login to utilize financial services by the payment service system.

10. The method of claim 9, wherein the at least one of the first user and the second user links the financial account of the respective user to the payment service system.

11. The method of claim 10, wherein the payment service system automatically registers the financial account and payment proxy identifier with the payment service system on behalf of the respective user.

12. The method of claim 11, wherein the payment service system stores an association of one or more financial accounts with the respective user's payment proxy identifier in a database.

13. The method of claim 1, wherein at least one of the financial accounts of the first and second users is a debit account associated with a debit card.

14. A method for effectuating a financial transaction between first and second users of a payment service system, the method comprising:
   receiving, by the payment service system, from an application executing on a first mobile device of the first user, a request for a first payment proxy identifier for the first user;
   receiving, by the payment service system from an application executing on a second mobile device of the second user, a request for a second payment proxy identifier for the second user;

generating, by the payment service system, the first and second payment proxy identifiers so that each of the first and second payment proxy identifiers (1) is for the respective first and second users, (2) has a currency indicator prefixing one or more alphanumeric characters, (3) is individually distinguishable from other payment proxy identifiers for other users, and (4) enables the payment service system to identify a financial account of a respective user in lieu of payment card mechanisms;

associating, by the payment service system, the first payment proxy identifier with a first financial account of the first user and the second payment proxy identifier with a second financial account of the second user;

receiving, by the payment service system, a message from the application executing on the second mobile device of the second user indicating a money transfer request from the second user for the second financial account to send funds to the first financial account, the message including a message body and the first payment proxy identifier in lieu of payment card mechanisms;

processing, by the payment service system, the money transfer request by initiating transfer of an amount of funds corresponding to the money transfer request from the second financial account to the first financial account; and transmitting, by the payment service system, an email message to an email address for the first user, wherein the email message includes the message body and a statement that the first user has received the amount of funds corresponding to the money transfer request.

15. The method of claim 14, wherein the processing of the money transfer request is triggered by the receiving the message indicating the money transfer request.

16. The method of claim 15, wherein the processing of the money transfer request includes parsing the message indicating the money transfer request.

17. The method of claim 14, wherein the currency indicator in each of the first and second payment proxy identifiers corresponds to a dollar sign.

18. The method of claim 17, wherein each of the first and second payment proxy identifiers consists of the dollar sign prefixing a set of one or more alphanumeric characters.

19. The method of claim 14, wherein at least one of the first user and the second user create an account login to utilize financial services by the payment service system.

20. The method of claim 19, wherein the at least one of the first user and the second user links the financial account of the respective user to the payment service system.

21. The method of claim 20, wherein the payment service system automatically registers the financial account and payment proxy identifier with the payment service system on behalf of the respective user.

22. The method of claim 21, wherein the payment service system stores an association of one or more financial accounts with the respective user's payment proxy identifier in a database.

23. The method of claim 14, wherein at least one of the financial accounts of the first and second users is a debit account associated with a debit card.

* * * * *